(12) United States Patent (10) Patent No.: US 12,683,450 B2
Shi et al. (45) Date of Patent: Jul. 14, 2026

(54) BUS ASSEMBLY, ELECTRICAL MOTOR, ELECTRIC POWER STEERING SYSTEM, AND VEHICLE

(71) Applicants: ANHUI WELLING AUTO PARTS CO., LTD., Hefei (CN); GUANGDONG WELLING AUTO PARTS CO., LTD., Foshan (CN)

(72) Inventors: Tao Shi, Hefei (CN); Jie Gong, Hefei (CN); Ke Xu, Hefei (CN); Xiao Ge, Hefei (CN)

(73) Assignees: ANHUI WELLING AUTO PARTS CO., LTD., Hefei (CN); GUANGDONG WELLING AUTO PARTS CO., LTD., Foshan (CN)

( * ) Notice: Subject to any disclaimer, the term of this patent is extended or adjusted under 35 U.S.C. 154(b) by 129 days.

(21) Appl. No.: 18/506,433

(22) Filed: Nov. 10, 2023

(65) Prior Publication Data

US 2024/0079923 A1 Mar. 7, 2024

Related U.S. Application Data

(63) Continuation of application No. PCT/CN2022/090372, filed on Apr. 29, 2022.

(30) Foreign Application Priority Data

May 14, 2021 (CN) .......................... 202110529297.0
May 14, 2021 (CN) .......................... 202121035460.X

(51) Int. Cl.
*H02K 3/28* (2006.01)
*H02K 3/50* (2006.01)

(52) U.S. Cl.
CPC ................. *H02K 3/28* (2013.01); *H02K 3/50* (2013.01); *H02K 2203/09* (2013.01)

(58) Field of Classification Search
CPC ......... H02K 3/28; H02K 3/50; H02K 2203/09
(Continued)

(56) References Cited

U.S. PATENT DOCUMENTS 7,948,130 B2 * 5/2011 Kitagawa ............... H02K 3/522
310/71
8,508,088 B2 * 8/2013 Sugiyama ................ H02K 3/50
310/260
(Continued)

FOREIGN PATENT DOCUMENTS

CN 103490545 A 1/2014
CN 105432002 A 3/2016
(Continued)

OTHER PUBLICATIONS

International Search Report dated Jul. 6, 2022 issued in PCT/CN2022/090372.
(Continued)

*Primary Examiner* — Oluseye Iwarere
*Assistant Examiner* — Minki Chang
(74) *Attorney, Agent, or Firm* — SCULLY, SCOTT, MURPHY & PRESSER, P.C.

(57) ABSTRACT

A bus assembly, an electrical motor, an electric power steering system, and a vehicle are provided. The bus assembly has multiple bus bars axially spaced along an electrical motor. Each bus bar has multiple bus segments arranged along the circumferential direction of the electrical motor. The bus segments of one of the bus bars have the same structure.

17 Claims, 12 Drawing Sheets

120

122 { 1223
1221
1222

1223

122b

1222b

122a

1222a

(58) Field of Classification Search
USPC .......................................................... 310/71
See application file for complete search history.

(56) References Cited

U.S. PATENT DOCUMENTS

| | | | | | |
|---|---|---|---|---|---|
| 11,088,594 | B2 * | 8/2021 | Hattori | ...................... | B62D 5/04 |
| 11,316,398 | B2 * | 4/2022 | Udo | ......................... | H02K 3/50 |
| 2003/0201688 | A1 * | 10/2003 | Yamamura | ............. | H02K 3/522 |
| | | | | | 310/71 |
| 2018/0079446 | A1 * | 3/2018 | Sun | ...................... | B62D 5/0406 |
| 2021/0194309 | A1 * | 6/2021 | Okamura | ............... | H02K 15/32 |
| 2022/0294300 | A1 * | 9/2022 | Jung | ......................... | H02K 3/28 |

FOREIGN PATENT DOCUMENTS

| | | | |
|---|---|---|---|
| CN | 105580248 | A | 5/2016 |
| CN | 110323869 | A | 10/2019 |
| CN | 210200992 | U | 3/2020 |
| CN | 111193345 | A | 5/2020 |
| CN | 111478476 | A | 7/2020 |
| CN | 112567601 | A | 3/2021 |
| CN | 112673553 | A | 4/2021 |
| CN | 215646428 | U | 1/2022 |
| DE | 112016001848 | T5 | 1/2018 |
| JP | 2007060743 | A | 3/2007 |
| JP | 2007330035 | A | 12/2007 |
| JP | 2017011829 | A | 1/2017 |
| JP | 2019068507 | A | 4/2019 |

OTHER PUBLICATIONS

Extended European search report dated Jul. 25, 2024 received in European patent Application No. 22806557.9.

First Office Action dated Jun. 3, 2025 received in Chinese Patent Application No. 202110529297.0.

Second Office Action dated Nov. 19, 2025 received in Chinese Patent Application No. 202110529297.0.

Chinese Office Action dated Apr. 1, 2026 received in Chinese Patent Application No. 202110529297.0.

* cited by examiner

BUS ASSEMBLY, ELECTRICAL MOTOR, ELECTRIC POWER STEERING SYSTEM, AND VEHICLE

CROSS-REFERENCE TO RELATED APPLICATIONS

This application is a continuation application of PCT International Patent Application No. PCT/CN2022/090372, filed on Apr. 29, 2022, which claims priority to and benefits of Chinese Patent Application No. 202110529297.0 filed with China National Intellectual Property Administration on May 14, 2021 and Chinese Patent Application No. 202121035460.X filed with China National Intellectual Property Administration on May 14, 2021, the entire contents of each of which are herein incorporated by reference for all purposes. No new matter has been introduced.

FIELD

The present disclosure relates to the field of electrical motors, and particularly relates to a bus assembly, an electrical motor, an electric power steering system, and a vehicle.

BACKGROUND

Currently, the bus bar of an electrical motor is composed of a plurality of bus bars, and the bus bars are connected to the starting end and the terminating end of the winding of a stator of the electrical motor to ensure the normal operation of the electrical motor.

In the prior art, on the one hand, the structures of the plurality of bus bars in the prior art are different from each other, multiple sets of dies are needed to prepare bus bars of different structures, and thus this directly renders the increasing of product costs and the lowering of product competitiveness, and on the other hand, the length of a single bus bar in a circumferential direction is relatively large, and this is unfavorable for the molding of the dies.

SUMMARY

The present disclosure aims to solve at least one of the problems that exist in the prior art or related art.

Thus, the first aspect of the present disclosure proposes a bus assembly.

The second aspect of the present disclosure proposes an electrical motor.

The third aspect of the present disclosure proposes an electric power steering system.

The fourth aspect of the present disclosure proposes a vehicle.

In view of this, the first aspect according to the present disclosure proposes a bus assembly for an electrical motor, and the bus assembly comprises a plurality of bus bars, the plurality of bus bars are axially spaced along the electrical motor, each bus bar comprises a plurality of bus segments, and the plurality of bus segments are arranged circumferentially along the electrical motor, and a plurality of bus segments of one bus bar have the same structure.

The bus assembly proposed in the present disclosure comprises a plurality of bus bars, and the plurality of bus bars are axially spaced along the electrical motor, to reduce the space requirement of the bus assembly in the radial direction of the electric al motor. Each bus bar is a conductor, and the bus bars are configured to connect the winding ends which need to be connected together in a plurality of windings in the stator of the electrical motor, to achieve the electrical connection of the plurality of winding ends and a bus function. Each bus bar in the plurality of bus bars comprises a plurality of bus segments, one bus bar is formed by the plurality of bus segments, the length of one bus segment in the circumferential direction is less than the entire length of one bus bar, then the processing difficulty of one bus segment is significantly less than one complete bus bar, and furthermore, this is favorable for the molding of dies. Furthermore, the plurality of bus segments of one bus bar have the same structure, that is, the plurality of bus segments of one bus bar can be prepared by one set of dies, and the number of bus bars to be prepared is reduced, the processing difficulty of the bus bars is lowered, the production efficiency is improved, the production costs of the bus bars are reduced and the product competitiveness is improved.

Furthermore, for the plurality of bus segments of one bus bar, the plurality of bus segments are arranged along the circumferential direction, and the outer contour of the bus assembly is in a ring shape, and it can be similar with the stator core of the electrical motor in structure, and this helps the reasonable arrangement of the internal space of the electrical motor. In an embodiment, the plurality of bus segments of one bus bar can be connected by welding, and thus one bus bar is formed, and this improves the structural integrity of the bus bar and helps the assembly of the bus bars. Or, the plurality of bus segments of one bus bar can be arranged at intervals, and thus can be better adapted to the wiring requirements of the stator winding.

In an embodiment, furthermore, the plurality of bus bars comprise at least three phase bus bars and a neutral bus bar, and the at least three phase bus bars have the same structure. The neutral bus bar is provided at the side of the at least three phase bus bars in the axial direction, and the structure of the neutral bus bar is different from the structure of the phase bus bars.

In this embodiment, the plurality of bus bars comprise two types, one type is a plurality of phase bus bars, and the other type is the neutral bus bar. The plurality of phase bus bars have the same structure, and then can share one set of dies. In an embodiment, the number of the phase bus bars is three, one phase bus bar comprises two bus segments, and then, for the bus assembly, six phase bus segments with the same structure can form three phase bus bars, and the six phase bus segments share one set of dies. The neutral bus bar comprises a plurality of neutral bus segments with the same structure, when the structure of the neutral bus segments is different from the structure of the phase bus segments, an additional set of dies is required for preparing the neutral bus segments. That is, for the entirety of the bus assembly, only two sets of dies are needed, and this will greatly reduce the production costs of the bus assembly, and meanwhile, the preparing process of the bus segments can further be simplified, and the working efficiency is improved.

In an embodiment, furthermore, each of the phase bus bar comprises a plurality of connecting portions, and the connecting portions are used for assembling a terminal assembly of the electrical motor. At least three phase bus bars comprise a first bus bar, a second bus bar and a third bus bar, which are axially arranged in sequence, and the second bus bar and the third bus bar rotate in the same direction around the central axis with respect to the first bus bar.

In this embodiment, each of the phase bus bar comprises a plurality of connection portions, and the connecting portions are used for disposing the terminal assembly of the electrical motor. In an embodiment, the plurality of connecting portions are disposed on the plurality of bus segments in a way of one-to-one correspondence. That is, one phase bus bar comprises a plurality of connecting portions (in an embodiment, two), the plurality of phase bus bars comprise a plurality of connecting portions (in a further embodiment, six), and then, for the assembling position of the terminal assembly, there are diversified choices, and thus, the connecting portions at appropriate positions can be selected according to the requirements of the interface of the electrical motor to assemble the terminal assembly and achieve the diversification of the interface of the electrical motor, and this can further improve the universality of the bus assembly, i.e., the bus assembly can match multiple types of terminal assemblies.

Furthermore, the number of the at least three phase bus bars is three, in an embodiment including a U phase bus bar, a V phase bus bar and a W phase bus bar. The three phase bus bars comprise a first bus bar, a second bus bar and a third bus bar, which are axially arranged in sequence, the second bus bar and the third bus bar rotate in the same direction around the central axis of the electrical motor with respect to the first bus bar, in an embodiment, the second bus bar and the third bus bar rotate counterclockwise or clockwise. The position of the first bus bar is fixed and does not change, the second bus bar and the third bus bar rotate in the same direction, and the connecting portions on each of the phase bus bar are arranged in a staggered way, that is, the connecting portions on different phase bus bars will not be shielded in the axial direction, and each connecting portion can be exposed and has the possibility of assembling the terminal assembly. Through adjusting the rotating angle of the second bus bar with respect to the first bus bar and adjusting the rotating angle of the third bus bar with respect to the first bus bar, multiple arrangement methods of the plurality of connecting portions can be achieved, and this helps achieve the diversified interfaces of the electrical motor.

In an embodiment, furthermore, the rotating angle of the second bus bar with respect to the first bus bar is the same as the rotating angle of the third bus bar with respect to the second bus bar.

In this embodiment, the rotating angle of the second bus bar with respect to the first bus bar is the same as the rotating angle of the third bus bar with respect to the second bus bar, that is, the rotating angles between two adjacent phase bus bars are the same, and thus it is achieved that the plurality of connecting portions are arranged at even intervals on the periphery of the bus assembly. In an embodiment, the rotating angle can be 30°, 60°, 90°, 120°, 150°, etc. Under different rotating angles, the connecting portions can form different interface positions corresponding to the terminals.

In an embodiment, furthermore, the plurality of bus segments of each of the phase bus bar comprise two phase bus segments, and the two phase bus segments are symmetrically arranged. Each phase bus segment comprises a main body segment, a first welding hook and a sub connecting portion, and the first welding hook is provided on the main body segment. The sub connecting portion is provided at one end of the main body segment. The sub connecting portion of one phase bus segment is welded to the sub connecting portion of another phase bus segment to form the connecting portions.

In this embodiment, for one phase bus bar, the two phase bus segments are symmetrically arranged, and this simplifies the structural arrangement. Each phase bus segment comprises the main body segment, the first welding hook and the sub connecting portion, and the first welding hook is configured to connect the wiring terminal of the stator winding. The number of the first welding hook on one phase bus segment is at least one. In an embodiment, the number of the first welding hook is two, and the two first welding hooks are arranged at intervals on the main body segment. The two phase bus segments of one phase bus bar are connected to each other, the sub connecting portion in one phase bus segment is welded with the sub connecting portion of the other phase bus segment to form a complete connecting portion, and the terminal assembly is welded on the connecting portion. That is, firstly, the connecting portion is formed by welding two phase bus segments, then the terminal assembly is welded, and the welding of the terminal assembly is achieved through twice welding. In an embodiment, one phase bus bar comprises a first phase bus segment and a second phase bus segment, the sub connecting portion of the first phase bus segment is welded with the sub connecting portion of the second phase bus segment, the first phase bus segment and the second phase bus segment are respectively provided with two first welding hooks, and for one phase bus bar, four first welding hooks are arranged at even intervals, and this is favorable for the arrangement of the plurality of first welding hooks on the plurality of phase bus bars.

In an embodiment, furthermore, the first welding hook comprises a plurality of welding arms, the plurality of welding arms are connected at intervals to the main body segment, the plurality of welding arms and the main body segment form a wire accommodating area, the wire accommodating area is configured to accommodate the winding of the electrical motor, and the volumes of at least two welding arms in the plurality of welding arms are different.

In this embodiment, one welding hook in the plurality of first welding hooks comprises a plurality of welding arms, the plurality of welding arms are connected at intervals to the main body segment, and the plurality of welding arms and the main body segment form the wire accommodating area. In an embodiment, the plurality of welding arms present a U type, a V type, etc. The wiring terminal of the winding of the electrical motor passes through the wire accommodating area, and further is connected to the welding arms. In an embodiment, the volumes of at least two welding arms in the plurality of welding arms are different, and thus the welding direction of the winding can be reminded. In an embodiment, the circumferential widths and/or the axial heights of the plurality of welding arms can be different, and thus the welding arms of different volumes can be formed. Furthermore, the free end of the welding arm transits smoothly, the internal wall surface of the wire accommodating area transits smoothly, and this prevents scratching the winding.

In an embodiment, furthermore, one phase bus bar comprises four first welding hooks arranged at even intervals, and two first welding hooks are provided on one phase bus segment.

In this embodiment, one phase bus bar comprises four first welding hooks arranged at even intervals, and two first welding hooks are provided on one phase bus segment, the connecting portions formed by the sub connecting portions of the two bus segments are located between two first welding hooks and the other two first welding hooks, and the phase bus bars integrally present a symmetrical structure, and this helps the staggered arrangement of the connecting portions on the plurality of phase bus bars.

In an embodiment, furthermore, the first welding hooks extend away from the central axis, and the sub connecting portions extend away from the central axis.

In this embodiment, the first welding hooks extend away from the central axis, i.e., at least a portion of the first welding hooks go beyond the external wall surface of the main body segment and are exposed, i.e., the first welding hooks are external welding hooks; the sub connecting portions extend away from the central axis, likewise, the connecting portion formed by two sub connecting portions further extends outwards, and this helps the welding of the terminal assembly. Both the first welding hooks and the sub connecting portions that the phase bus segments comprise extend outwards, then the structure is simplified, and the processing difficulty is lowered.

In an embodiment, furthermore, the plurality of bus segments of each neutral bus bar comprise two neutral bus segments, the two neutral bus segments are arranged symmetrically at intervals along the circumferential direction, and the neutral bus segment comprises a second welding hook extending towards the central axis.

In this embodiment, the plurality of bus segments of each neutral bus bar comprise two neutral bus segments, the two neutral bus segments have the same structure, i.e., only one set of dies is needed to prepare the neutral bus bar. The two neutral bus segments are arranged symmetrically at intervals along the circumferential direction. That is, for the bus assembly, three phase bus bars share one set of dies, and the plurality of neutral bus segments in the neutral bus bars share one set of dies. Each neutral bus segment comprises a plurality of second welding hooks which extend towards the central axis, and the second welding hooks are configured to connect the winding of the electrical motor. Through disposing the first welding hooks and the second welding hooks of different orientations, the plurality of welding hooks are prevented from concentrating on the same position, then the space is used reasonably, the distance between two adjacent welding hooks in the plurality of welding hooks is increased, the difficulty for winding wire, trimming wire and welding is lowered, and the assembly efficiency is improved.

In an embodiment, furthermore, the bus assembly further comprises a bus framework, and the plurality of bus bars are arranged at intervals on the bus framework. A positioning portion is provided on the bus framework, the positioning portion is configured to cooperate with a stator framework of the electrical motor, the positioning portion comprises a first positioning element and a second positioning element, the first positioning element is provided on the wall surface of the bus framework close to the central axis. The second positioning element is provided on the wall surface of the bus framework away from the central axis.

In this embodiment, the bus assembly further comprises the bus framework, and the plurality of bus bars are arranged at intervals on the bus framework. The bus framework is configured to provide support for the plurality of bus bars and meanwhile to isolate the adjacent bus bars in the plurality of bus bars, and thus takes an electrical insulation effect. In an embodiment, the bus framework can be an injection molded part, the injection molded part can be injection molded with the plurality of bus bars integrally. The number of the positioning portion is multiple, the plurality of positioning portions are provided at intervals on the bus framework, and thus all-around positioning and installation are achieved. Furthermore, the positioning portion comprises the first positioning element and the second positioning element, the first positioning element is provided on the wall surface of the bus framework close to the central axis. The second positioning element is provided on the wall surface of the bus framework away from the central axis. That is, the positioning portion comprises a first positioning element facing inside and a second positioning element facing outside, to achieve internal and external two-stage positioning and installation.

In an embodiment, furthermore, the number of the first positioning element is greater than the number of the second positioning element.

In this embodiment, the number of the first positioning elements which are located at the inner circumference of the bus framework is relatively large, the number of the second positioning elements which are located at the outer circumference of the bus framework is relatively small, and within a limited circumferential space, the first positioning elements and the second positioning elements are reasonably arranged. A plurality of first welding hooks and a plurality of connecting portions need to be arranged protruding out of the outer wall surface of the bus framework, and thus the remaining usable space of the outer wall surface of the bus framework is limited. In an embodiment, there are six first positioning elements, there are three second positioning elements, one positioning element is provided between two adjacent terminal assemblies, and thus a uniform force connection between the bus framework and the stator framework can be achieved.

In an embodiment, furthermore, the bus assembly further comprises an assembling portion, the assembling portion is provided on the bus framework, and the assembling portion is configured to assemble the terminal assembly of the electrical motor.

In embodiment, a portion of the bus framework extends along the axial direction, i.e., the portion of the bus framework extends outwards to form the assembling portion, one assembling portion is provided between two first welding hooks, and the assembling portion is configured to assemble the terminal assembly of the electrical motor, and thus the reliable connection performance of the terminal assembly is ensured.

The second aspect according to the present disclosure proposes an electrical motor, including: a housing, a stator framework and the bus assembly provided in any of the previous embodiments. The bus assembly is provided in the housing, the stator framework is provided at the side of the bus assembly in the axial direction. A winding is provided on the stator framework, and the winding is connected to the first welding hook of the bus assembly.

The electrical motor proposed by the present disclosure comprises the bus assembly provided in any of the previous embodiments, and thus has all the beneficial effects of the bus assembly, which will not be repeated herein.

In an embodiment, furthermore, the stator framework comprises a framework body and a cooperating portion. The cooperating portion is provided at the side of the framework body close to the bus assembly, and the cooperating portion is connected to the positioning portion of the bus assembly.

In this embodiment, the stator framework comprises the framework body and the cooperating portion, the cooperating portion is provided at the side of the framework body close to the bus assembly, and the cooperating portion is connected to the positioning portion of the bus assembly, to achieve the accurate connection between the framework body and the bus assembly.

The positioning portion and the cooperating portion can be in snap connection, or rivet connection, screw joint connection, etc.

In an embodiment, furthermore, the electrical motor further comprises a control assembly and a terminal assembly, the control assembly is provided at the other side of the bus assembly along the axial direction, and the control assembly comprises a controller. The terminal assembly comprises a terminal framework and a wiring terminal provided on the terminal framework, the wiring terminal is connected between the connecting portion of the bus assembly and the controller, and the terminal framework is installed at an assembling portion of the bus assembly.

In this embodiment, a portion of the terminal framework is connected to the assembling portion of the bus assembly, and thus the connection of an insulation portion is achieved; one end of the wiring terminal is connected to the controller, the other end of the wiring terminal is connected to the connecting portion, and a winding is connected to the controller through the bus assembly and the wiring terminal.

The wiring terminal and the connecting portion are connected by a resistance welding manner, and apparently, they can further be connected by other welding methods such as ultrasonic welding or other fixed connection methods. In an embodiment, the number of the wiring terminal is three.

Furthermore, a plurality of wiring terminals are arranged at even intervals on the bus assembly, and then, one wiring terminal is arranged corresponding to one terminal framework, the plurality of wiring assemblies are arranged at intervals on the bus assembly, and at the moment, two adjacent wiring assemblies are arranged at an interval of 120°.

In an embodiment, furthermore, a plurality of wiring terminals are arranged at intervals on one terminal framework. A plurality of first welding hooks of the bus assembly comprise third welding hooks located between adjacent wiring terminals. The terminal assembly further comprises an avoid opening, and the avoid opening is provided in the terminal framework corresponding to the third welding hooks.

In this embodiment, a plurality of wiring terminals are arranged at intervals on one terminal framework, in an embodiment, two adjacent wiring terminals are arranged at an interval of 30°, the wiring terminals have the same structure and can share one set of dies. Since the first welding hook extends outwards, when the terminal assembly is mounted on the bus assembly, a portion of the terminal framework will be located at the side of a portion of the first welding hook (the third welding hook) in the axial direction; considering the weldability of the third welding hook with the winding, the avoid opening is provided in the terminal framework corresponding to the third welding hook, and thus, the problem of interference possibly caused by the terminal framework during the processes of winding wire and trimming wire can be prevented.

The third aspect according to the present disclosure proposes an electric power steering system, including the electrical motor provided in any of the previous embodiments.

The electric power steering system proposed by the present disclosure comprises the electrical motor provided by any of the previous embodiments, and thus has all the beneficial effects of the electrical motor, which will not be repeated herein.

The fourth aspect according to the present disclosure proposes a vehicle, including the electric power steering system provided in any of the previous embodiments.

The vehicle proposed by the present disclosure comprises the electric power steering system provided in any of the previous embodiments, and thus has all the beneficial effects of the electric power steering system, which will not be repeated herein.

The vehicle can be a traditional fuel vehicle, and can further be a new energy vehicle. The new energy vehicle comprises a pure electric vehicle, an extended-range electric vehicle, a hybrid electric vehicle, a fuel cell electric vehicle, a hydrogen engine car, and so on.

The additional aspects and advantages of the present disclosure will be obvious in the following description, or can be understood through the implementation of the present disclosure.

BRIEF DESCRIPTION OF THE DRAWINGS

The above and/or additional aspects and advantages of the present disclosure will be obvious and understood easily from the following description of the embodiments in combination with the accompanying drawings. And, FIG. 1 shows a schematic view of a portion of the structure of a bus assembly according to an embodiment of the present disclosure.

The corresponding relationships between the reference signs and the component names in FIGS. 1-16 are as follows:

100: bus assembly,
    110: bus bar, 110a: bus segment,
    120: phase bus bar, 121: connecting portion,
    122: phase bus segment, 122a: first phase bus segment, 122b: second phase bus segment,
    1221: main body segment,
    1222: first welding hook, 1222a: welding arm, 1222b: wire accommodating area,
    1223: sub connecting portion,
    130: neutral bus bar, 131: neutral bus segment, 132: second welding hook, 140: bus framework,
    141: positioning portion, 141a: first positioning element, 141b: second positioning element,
    142: assembling portion,
    200: electrical motor,
    210: stator framework, 211: winding,
    220: terminal assembly, 221: terminal framework, 222: wiring terminal, and 223: avoid opening.

DETAILED DESCRIPTION OF THE DISCLOSURE

In order to understand the above-mentioned objectives, features and advantages of the present disclosure more clearly, a further detailed description of the present disclosure will be given below in combination with the accompanying drawings and exemplary embodiments. It should be noted that the embodiments of the present disclosure and the features in the embodiments can be combined with each other if there is no conflict.

In the following description, numerous specific details are set forth in order to provide a thorough understanding of the present disclosure. However, the present disclosure can further be implemented in other manners than those described herein. Therefore, the scope of the embodiments of the present disclosure is not limited to the exemplary embodiments disclosed below.

A bus assembly 100, an electrical motor 200, an electric power steering system and a vehicle proposed by some embodiments of the present disclosure are described below with reference to FIGS. 1-16.

Figure 1:
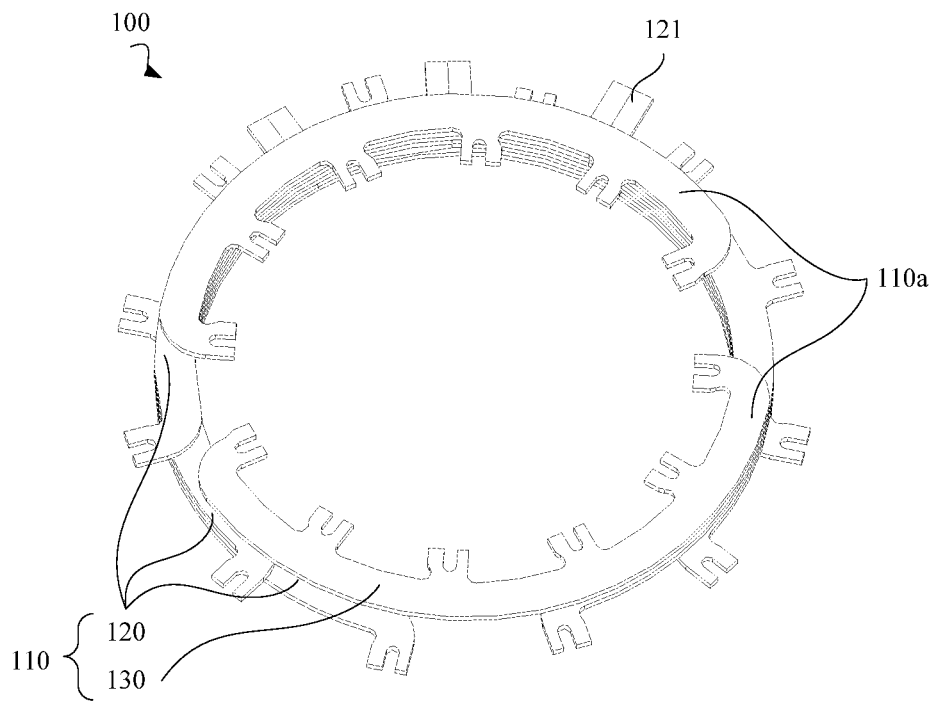

The first aspect according to the present disclosure proposes a bus assembly 100 for an electrical motor 200, as shown in FIG. 1, the bus assembly 100 comprises a plurality of bus bars 110, the plurality of bus bars 110 are axially spaced along the electrical motor 200, each bus bar 110 comprises a plurality of bus segments 110a, and the plurality of bus segments 110a are arranged circumferentially along the electrical motor 200, and a plurality of bus segments 110a of one bus bar 110 have the same structure.

The bus assembly 100 proposed in the present disclosure comprises a plurality of bus bars 110, and the plurality of bus bars 110 are axially spaced along the electrical motor 200, to reduce the space requirement of the bus assembly 100 in the radial direction of the electrical motor 200. Each bus bar 110 is a conductor, and the bus bars 110 are configured to connect the winding 211 ends which need to be connected together in a plurality of windings 211 in the stator of the electrical motor 200, to achieve the electrical connection of the plurality of the ends of the winding 211 and a bus function. Each bus bar 110 in the plurality of bus bars 110 comprises a plurality of bus segments 110a, one bus bar 110 is formed by the plurality of bus segments 110a, the length of one bus segment 110a in the circumferential direction is less than the entire length of one bus bar 110, then the processing difficulty of one bus segment 110a is significantly less than one complete bus bar 110, and furthermore, this is favorable for the molding of dies. Furthermore, the plurality of bus segments 110a of one bus bar 110 have the same structure, that is, the plurality of bus segments 110a of one bus bar 110 can be prepared by one set of dies, and the number of bus bars 110 to be prepared is reduced, the processing difficulty of the bus bars 110 is lowered, the production efficiency is improved, the production costs of the bus bars are reduced and the product competitiveness is improved.

Figure 2:
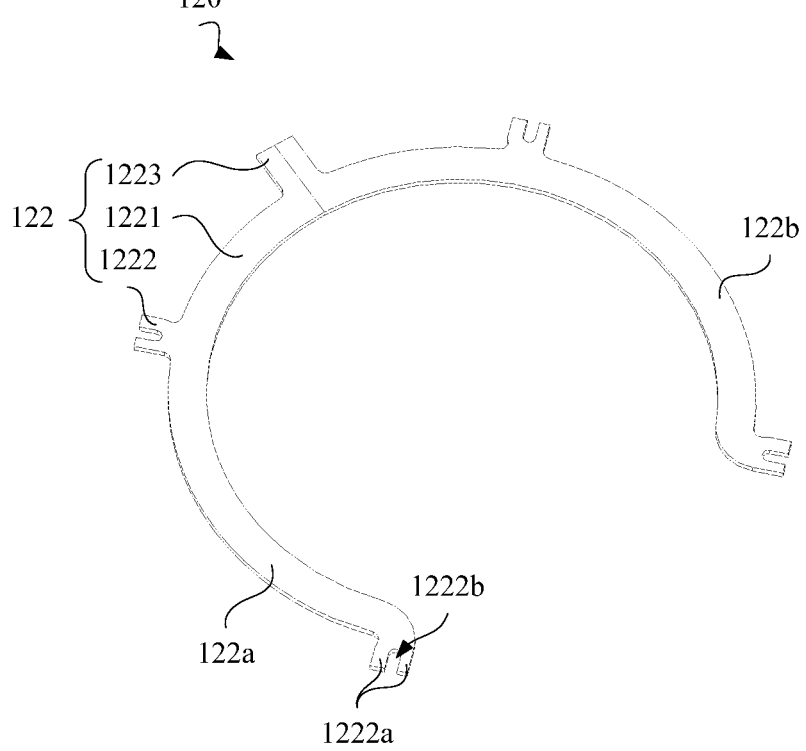
FIG. 2 shows a schematic view of the structure of one phase bus bar in a bus assembly according to an embodiment of the present disclosure.
Figure 3:
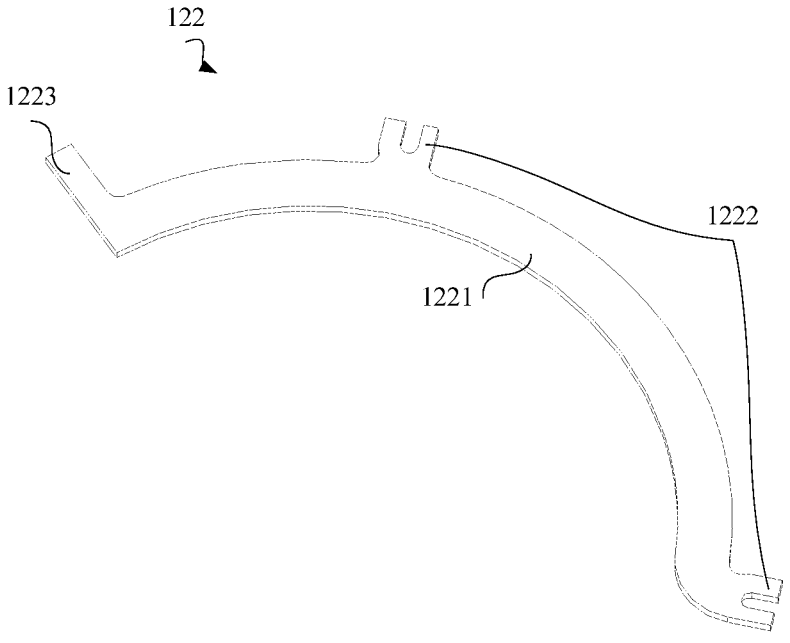
FIG. 3 shows a schematic view of the structure of one phase bus segment in a bus assembly according to an embodiment of the present disclosure.

In an embodiment, as shown in FIG. 2, the structures of the plurality of the bus bars 110 can be partially the same, then the bus bars 110 with the same structure can share one set of dies, and this can further reduce the costs of the dies. That is, the plurality of bus segments 110a of one bus bar 110 have the same structure. The structures of the plurality of the bus bars 110 can be partially equal, and can further be unequal. For one bus bar 110, the difficulty for molding can be lowered by the plurality of bus segments 110a, and only one set of dies is needed.

The material of the bus bars 110 can be copper, copper has relatively good conductivity, and its price is relatively low; in addition, copper has advantages that it can be easily stamped and molded and has sufficient hardness.

Furthermore, as shown in FIGS. 1 and 2, for the plurality of bus segments 110a of one bus bar 110, the plurality of bus segments 110a are arranged along the circumferential direction, and the outer contour of the bus assembly 100 is in a ring shape, and it can be similar with the stator core of the electrical motor 200 in structure, and this helps the reasonable arrangement of the internal space of the electrical motor 200. In an embodiment, the plurality of bus segments 110a of one bus bar 110 can be connected by welding, and thus one bus bar 110 is formed. This improves the structural integrity of the bus bars 110 and facilitates the assembly of the bus bars 110. The plurality of bus segments 110a of one bus bar 110 can be arranged at intervals, and thus can be better adapted to the wiring requirements of the stator winding 211.

Furthermore, as shown in FIG. 1, the plurality of bus bars 110 comprise at least three phase bus bars 120 and a neutral bus bar 130, and the at least three phase bus bars 120 have the same structure. The neutral bus bar 130 is provided at the side of the at least three phase bus bars 120 in the axial direction, and the structure of the neutral bus bar 130 is different from the structure of the phase bus bars 120.

In the embodiment, the plurality of bus bars 110 comprise two types, one type is a plurality of phase bus bars 120, and the other type is the neutral bus bar 130. The plurality of phase bus bars 120 have the same structure, and then can share one set of dies. In an embodiment, the number of the phase bus bars 120 is three, one phase bus bar 120 comprises two phase bus segments 122, and then, for the bus assembly 100, six phase bus segments 122 with the same structure can form three phase bus bars 120, and the six phase bus segments 122 share one set of dies. The neutral bus bar 130 comprises a plurality of neutral bus segments 131 with the same structure, when the structure of the neutral bus segments 131 is different from the structure of the phase bus segments 122, an additional set of dies is required for preparing the neutral bus segments 131. That is, for the entirety of the bus assembly 100, only two sets of dies are needed, and this will greatly reduce the production costs of the bus assembly 100, and meanwhile, the preparing process of the bus segments 110a can further be simplified, and the working efficiency is improved.

Furthermore, as shown in FIGS. 1-5, each of the phase bus bar 120 comprises a plurality of connecting portions 121, and the connecting portions 121 are used for assembling a terminal assembly 220 of the electrical motor 200. At least three phase bus bars 120 comprise a first bus bar 110, a second bus bar 110 and a third bus bar 110, which are axially arranged in sequence, and the second bus bar 110 and the third bus bar 110 rotate in the same direction around the central axis with respect to the first bus bar 110.

In the embodiment, each of the phase bus bar 120 comprises a plurality of connection portions 121, and the connecting portions 121 are used for disposing the terminal assembly 220 of the electrical motor 200. In an embodiment, the plurality of connecting portions 121 are disposed on the plurality of bus segments 110a in a way of one-to-one correspondence. That is, one phase bus bar 120 comprises a plurality of connecting portions 121 (in an embodiment, two), the plurality of phase bus bars 120 comprise a plurality of connecting portions 121 (in a further embodiment, six), and then, for the assembling position of the terminal assembly 220, there are diversified choices, and thus, the connecting portions 121 at appropriate positions can be selected according to the requirements of the interface of the electrical motor 200 to assemble the terminal assembly 220 and achieve the diversification of the interface of the electrical motor 200, and this can further improve the universality of the bus assembly 100, i.e., the bus assembly 100 can match multiple types of terminal assemblies 220.

Furthermore, the number of the at least three phase bus bars 120 is three, in an embodiment including a U phase bus bar 120, a V phase bus bar 120 and a W phase bus bar 120. The three phase bus bars 120 comprise a first bus bar 110, a second bus bar 110 and a third bus bar 110, which are axially arranged in sequence, the second bus bar 110 and the third bus bar 110 rotate in the same direction around the central axis of the electrical motor 200 with respect to the first bus bar 110, in an embodiment, the second bus bar 110 and the third bus bar 110 rotate counterclockwise or clockwise. The position of the first bus bar 110 is fixed and does not change, the second bus bar 110 and the third bus bar 110 rotate in the same direction, and the connecting portions 121 on each of the phase bus bar 120 are arranged in a staggered way, that is, the connecting portions 121 on different phase bus bars 120 will not be shielded in the axial direction, and each connecting portion 121 can be exposed and has the possibility of assembling the terminal assembly 220. Through adjusting the rotating angle of the second bus bar 110 with respect to the first bus bar 110 and adjusting the rotating angle of the third bus bar 110 with respect to the first bus bar 110, multiple arrangement methods of the plurality of connecting portions 121 can be achieved, and this helps achieve the diversified interfaces of the electrical motor 200.

Furthermore, as shown in FIG. 1, the rotating angle of the second bus bar 110 with respect to the first bus bar 110 is the same as the rotating angle of the third bus bar 110 with respect to the second bus bar 110.

In the embodiment, the rotating angle of the second bus bar 110 with respect to the first bus bar 110 is the same as the rotating angle of the third bus bar 110 with respect to the second bus bar 110, that is, the rotating angles between two adjacent phase bus bars 120 are the same, and thus it is achieved that the plurality of connecting portions 121 are arranged at even intervals on the periphery of the bus assembly 100. In an embodiment, as shown in FIGS. 1, 7, 8 and 13, the rotating angle can be 30°, 60°, 90°, 120°, 150°, etc. Under different rotating angles, the connecting portions 121 can form different interface positions corresponding to the terminals.

Furthermore, as shown in FIGS. 2-5, the plurality of bus segments 110a of each of the phase bus bar 120 comprise two phase bus segments 122, and the two phase bus segments 122 are symmetrically arranged. Each phase bus segment 122 comprises a main body segment 1221, a first welding hook 1222 and a sub connecting portion 1223, and the first welding hook 1222 is provided on the main body segment 1221. The sub connecting portion 1223 is provided at one end of the main body segment 1221. The sub connecting portion 1223 of one phase bus segment 122 is welded to the sub connecting portion 1223 of another phase bus segment 122 to form the connecting portions 121.

In the embodiment, for one phase bus bar 120, the two phase bus segments 122 are symmetrically arranged, and this simplifies the structural arrangement. Each phase bus segment 122 comprises the main body segment 1221, the first welding hook 1222 and the sub connecting portion 1223, and the first welding hook 1222 is configured to connect the wiring terminal of the stator winding 211. The number of the first welding hook 1222 on one phase bus segment 122 is at least one. In an embodiment, the number of the first welding hook 1222 is two, and the two first welding hooks are arranged at intervals on the main body segment 1221. The two phase bus segments 122 of one phase bus bar 120 are connected to each other, the sub connecting portion 1223 in one phase bus segment 122 is welded with the sub connecting portion 1223 of the other phase bus segment 122 to form a complete connecting portion 121, and the terminal assembly 220 is welded on the connecting portion 121. That is, firstly, the connecting portion 121 is formed by welding two phase bus segments 122, then the terminal assembly 220 is welded, and the welding of the terminal assembly 220 is achieved through twice welding. In an embodiment, as shown in FIGS. 4 and 5, one phase bus bar 120 comprises a first phase bus segment 122a and a second phase bus segment 122b, the sub connecting portion 1223 of the first phase bus segment 122a is welded with the sub connecting portion 1223 of the second phase bus segment 122b, the first phase bus segment 122a and the second phase bus segment 122b are respectively provided with two first welding hooks 1222, and for one phase bus bar 120, four first welding hooks 1222 are arranged at even intervals, and this is favorable for the arrangement of the plurality of first welding hooks 1222 on the plurality of phase bus bars 120.

Furthermore, as shown in FIG. 2, the first welding hook 1222 comprises a plurality of welding arms 1222a, the plurality of welding arms 1222a are connected at intervals to the main body segment 1221, the plurality of welding arms 1222a and the main body segment 1221 form a wire accommodating area 1222b, the wire accommodating area 1222b is configured to accommodate the winding 211 of the electrical motor 200, and the volumes of at least two welding arms 1222a in the plurality of welding arms 1222a are different.

In the embodiment, one welding hook in the plurality of first welding hooks 1222 comprises a plurality of welding arms 1222a, the plurality of welding arms 1222a are connected at intervals to the main body segment 1221, and the plurality of welding arms 1222a and the main body segment 1221 form the wire accommodating area 1222b. In an embodiment, the plurality of welding arms 1222a present a U type, a V type, etc. The wiring terminal of the winding 211 of the electrical motor 200 passes through the wire accommodating area 1222b, and further is connected to the welding arms 1222a. In an embodiment, the volumes of at least two welding arms 1222a in the plurality of welding arms 1222a are different, and thus the welding direction of the winding 211 can be reminded. In an embodiment, the circumferential widths and/or the axial heights of the plurality of welding arms 1222a can be different, and thus the welding arms 1222a of different volumes can be formed. Furthermore, the free end of the welding arm 1222a transits smoothly, the internal wall surface of the wire accommodating area 1222b transits smoothly, and this prevents scratching the winding.

Figure 4:
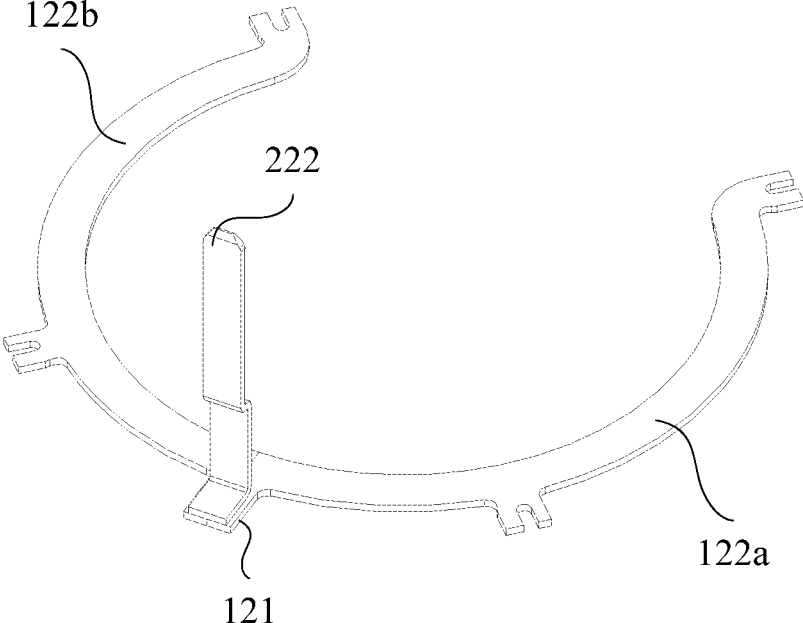
FIG. 4 shows the first schematic view of the assembling of one phase bus bar and a terminal assembly in a bus assembly according to an embodiment of the present disclosure.
Figure 5:
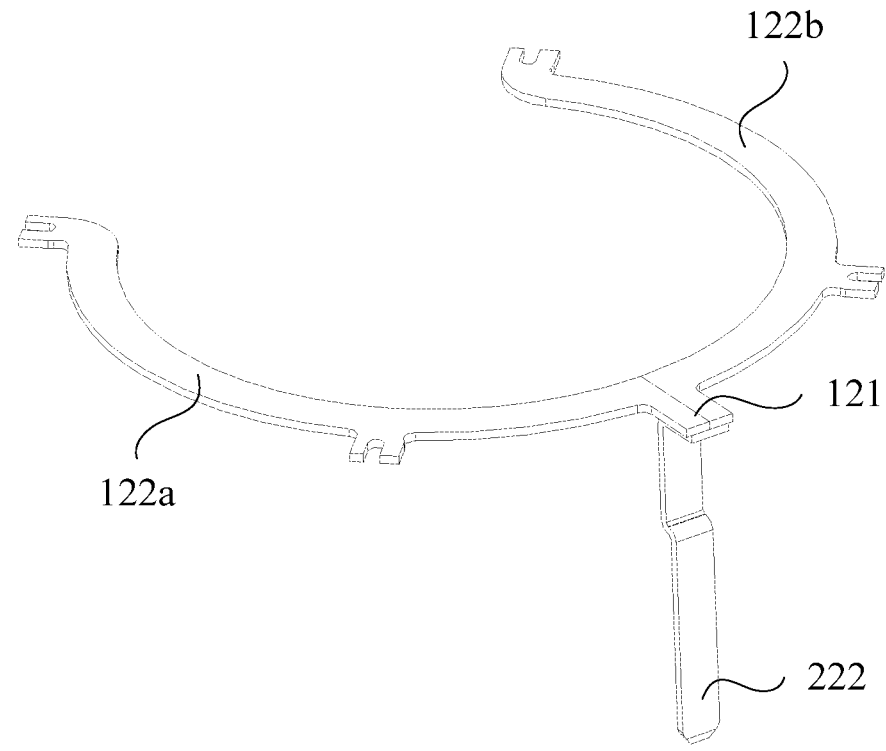
FIG. 5 shows the second schematic view of the assembling of one phase bus bar and a terminal assembly in a bus assembly according to an embodiment of the present disclosure.

Furthermore, as shown in FIGS. 2, 4 and 5, one phase bus bar 120 comprises four first welding hooks 1222 arranged at even intervals, and two first welding hooks 1222 are provided on one phase bus segment 122.

In the embodiment, one phase bus bar 120 comprises four first welding hooks 1222 arranged at even intervals, and two first welding hooks 1222 are provided on one phase bus segment 122, the connecting portions 121 formed by the sub connecting portions 1223 of the two bus segments 110a are located between two first welding hooks 1222 and the other two first welding hooks 1222, and the phase bus bars 120 integrally present a symmetrical structure, and this helps the staggered arrangement of the connecting portions 121 on the plurality of phase bus bars 120.

Furthermore, as shown in FIGS. 1-5, the first welding hooks 1222 extend away from the central axis, and the sub connecting portions 1223 extend away from the central axis.

In the embodiment, the first welding hooks 1222 extend away from the central axis, i.e., at least a portion of the first welding hooks 1222 go beyond the external wall surface of the main body segment 1221 and are exposed, i.e., the first welding hooks 1222 are external welding hooks; the sub connecting portions 1223 extend away from the central axis, likewise, the connecting portion 121 formed by two sub connecting portions 121 further extends outwards, and this helps the welding of the terminal assembly 220. Both the first welding hooks 1222 and the sub connecting portions 1223 that the phase bus segments 122 comprise extend outwards, then the structure is simplified, and the processing difficulty is lowered.

Figure 6:
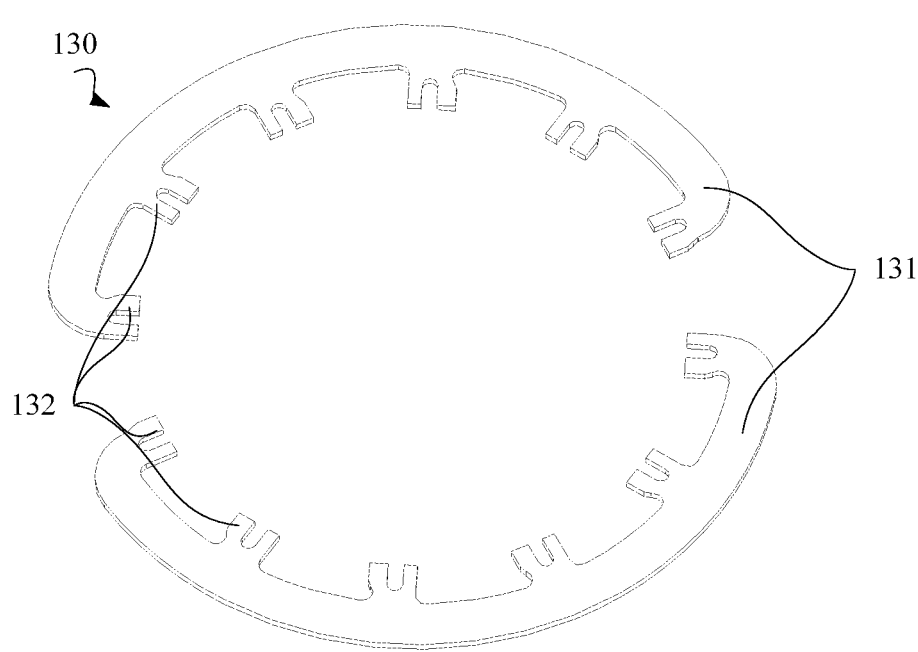
FIG. 6 shows a schematic view of the structure of one neutral bus segment in a bus assembly according to an embodiment of the present disclosure.

Furthermore, as shown in FIG. 6, the plurality of bus segments 110a of each neutral bus bar 130 comprise two neutral bus segments 131, the two neutral bus segments are arranged symmetrically at intervals along the circumferential direction, and the neutral bus segment 131 comprises a second welding hook 132 extending towards the central axis.

In the embodiment, the plurality of bus segments 110a of each neutral bus bar 130 comprise two neutral bus segments 131, the two neutral bus segments 131 have the same structure, i.e., only one set of dies is needed to prepare the neutral bus bar 130. The two neutral bus segments 131 are arranged symmetrically at intervals along the circumferential direction. That is, for the bus assembly 100, three phase bus bars 120 share one set of dies, and the plurality of neutral bus segments 131 in the neutral bus bars 130 share one set of dies. Each neutral bus segment 131 comprises a plurality of second welding hooks 132 which extend towards the central axis, and the second welding hooks 132 are configured to connect the winding 211 of the electrical motor 200. Through disposing the first welding hooks 1222 and the second welding hooks 132 of different orientations, the plurality of welding hooks are prevented from concentrating on the same position, then the space is used reasonably, the distance between two adjacent welding hooks in the plurality of welding hooks is increased, the difficulty for winding wire, trimming wire and welding is lowered, and the assembly efficiency is improved.

Figure 7:
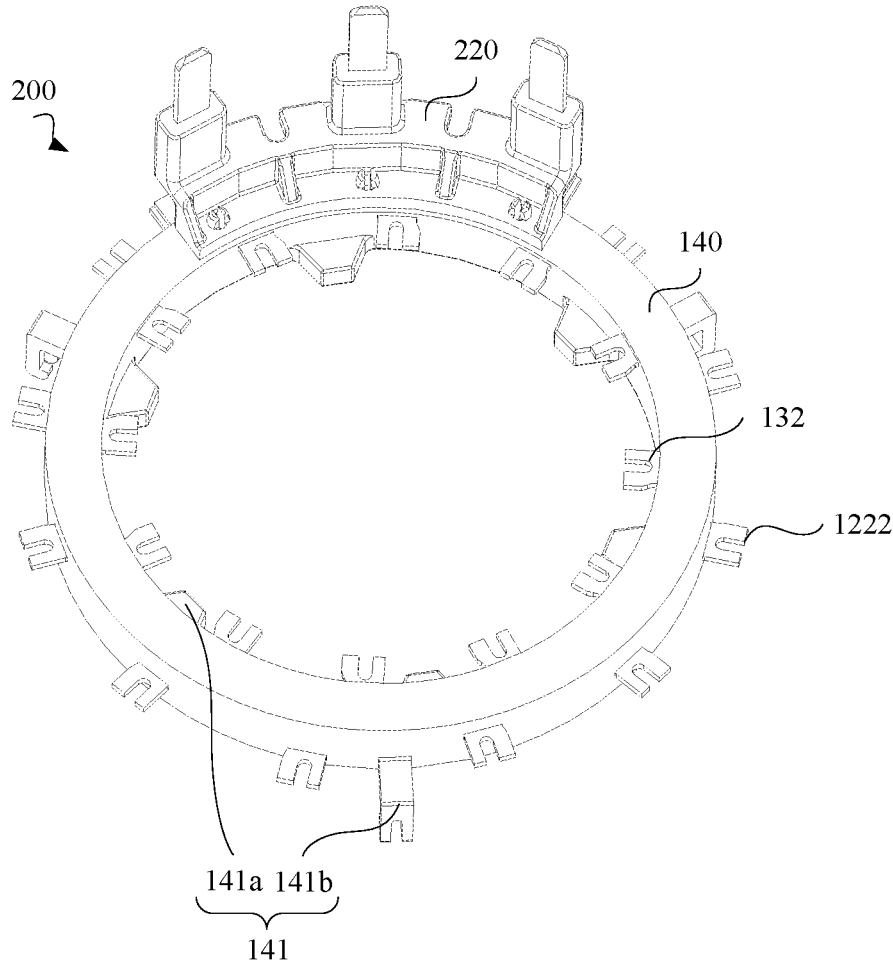
FIG. 7 shows the first schematic view of a portion of the structure of an electrical motor according to an embodiment of the present disclosure.
Figure 8:
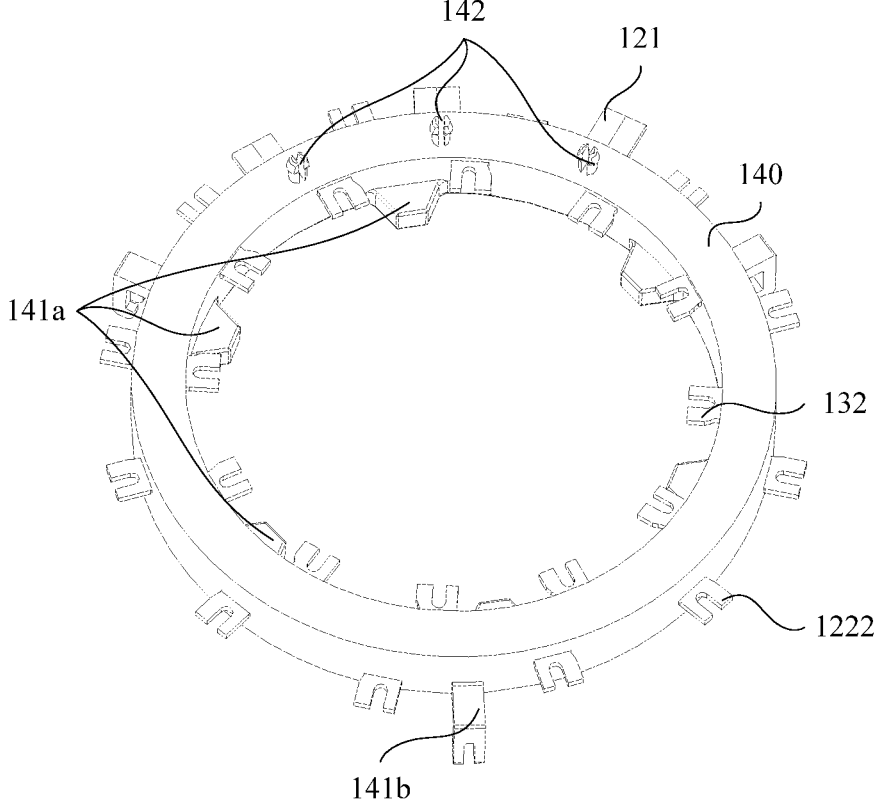
FIG. 8 shows a schematic view of the structure of a bus assembly according to an embodiment of the present disclosure.
Figure 9:
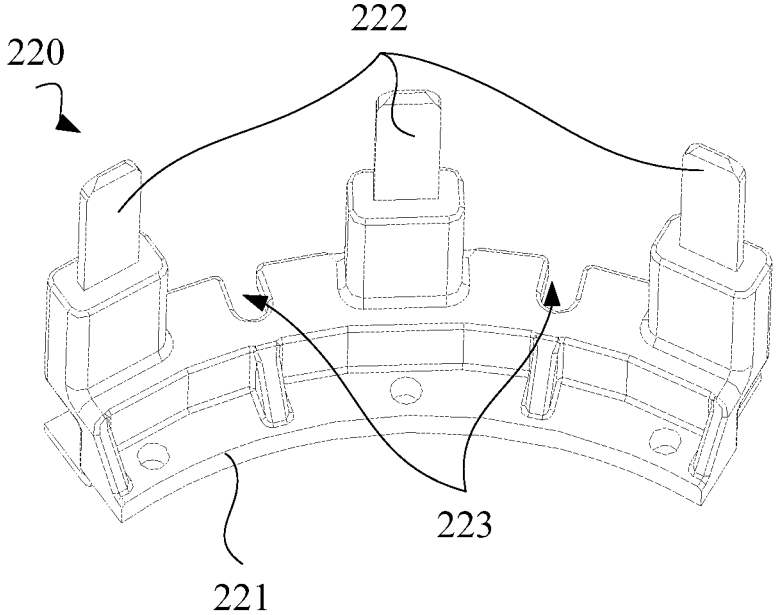
FIG. 9 shows a schematic view of the structure of a terminal assembly in an electrical motor according to an embodiment of the present disclosure.

Furthermore, as shown in FIGS. 7 and 8, the bus assembly 100 further comprises a bus framework 140, and the plurality of bus bars 110 are arranged at intervals on the bus framework 140. A positioning portion 141 is provided on the bus framework 140, the positioning portion 141 is configured to cooperate with a stator framework 210 of the electrical motor 200, the positioning portion 141 comprises a first positioning element 141a and a second positioning element 141b, the first positioning element 141a is provided on the wall surface of the bus framework 140 close to the central axis. The second positioning element 141b is provided on the wall surface of the bus framework 140 away from the central axis.

In the embodiment, the bus assembly 100 further comprises the bus framework 140, and the plurality of bus bars 110 are arranged at intervals on the bus framework 140. The bus framework 140 is configured to provide support for the plurality of bus bars 110 and meanwhile to isolate the adjacent bus bars 110 in the plurality of bus bars 110, and thus takes an electrical insulation effect. In an embodiment, the bus framework 140 can be an injection molded part, the injection molded part can be injection molded with the plurality of bus bars 110 integrally. The number of the positioning portion 141 is multiple, the plurality of positioning portions 141 are provided at intervals on the bus framework 140, and thus all-around positioning and installation are achieved. Furthermore, the positioning portion 141 comprises the first positioning element 141a and the second positioning element 141b, the first positioning element 141a is provided on the wall surface of the bus framework 140 close to the central axis. The second positioning element 141b is provided on the wall surface of the bus framework 140 away from the central axis. That is, the positioning portion 141 comprises a first positioning element 141a facing inside and a second positioning element 141b facing outside, to achieve internal and external two-stage positioning and installation.

Furthermore, as shown in FIGS. 7, 8, 10, 13, 14 and 15, the number of the first positioning element 141a is greater than the number of the second positioning element 141b.

In the embodiment, the number of the first positioning elements 141a which are located at the inner circumference of the bus framework 140 is relatively large, the number of the second positioning elements 141b which are located at the outer circumference of the bus framework 140 is relatively small, and within a limited circumferential space, the first positioning elements 141a and the second positioning elements 141b are reasonably arranged. A plurality of first welding hooks 1222 and a plurality of connecting portions 121 need to be arranged protruding out of the outer wall surface of the bus framework 140, and thus the remaining usable space of the outer wall surface of the bus framework 140 is limited. In an embodiment, there are six first positioning elements 141a, there are three second positioning elements 141b, one positioning element is provided between two adjacent terminal assemblies 220, and thus a uniform force connection between the bus framework 140 and the stator framework 210 can be achieved.

Figure 15:
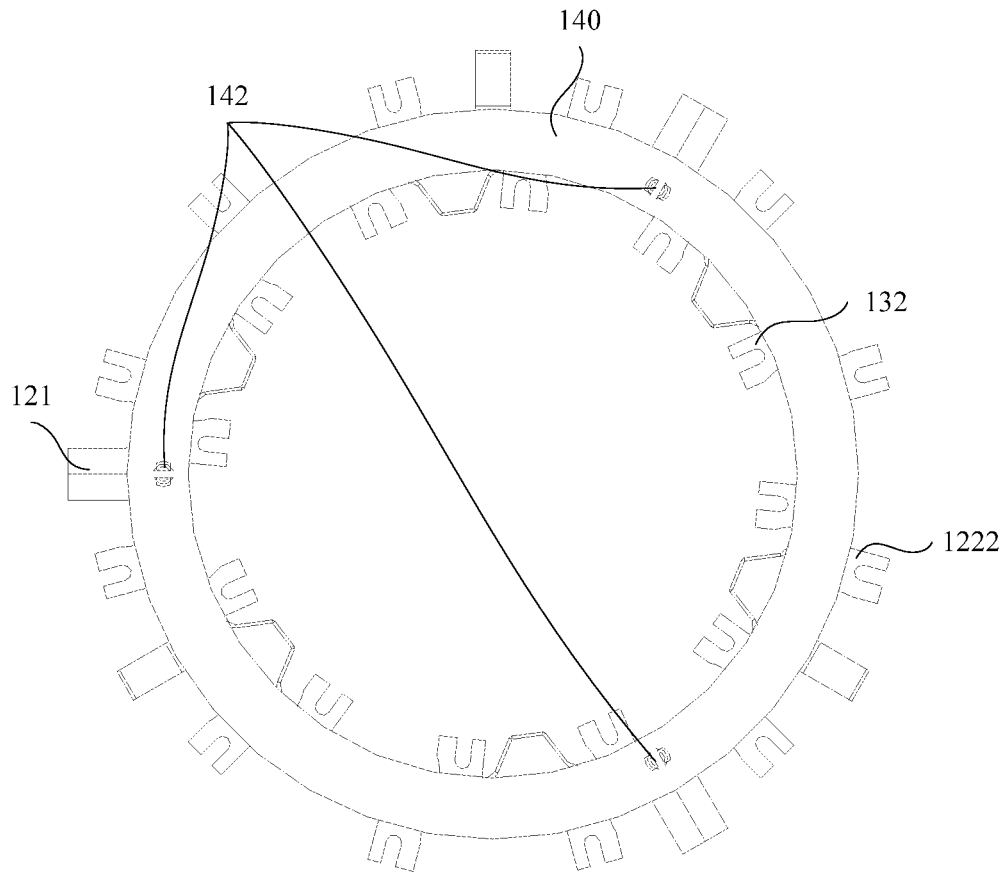
FIG. 15 shows a schematic view of the structure of a bus assembly according to still another embodiment of the present disclosure.

Furthermore, as shown in FIGS. 8 and 15, the bus assembly 100 further comprises an assembling portion 142, the assembling portion 142 is provided on the bus framework 140, and the assembling portion 142 is configured to assemble the terminal assembly 220 of the electrical motor 200.

In the embodiment, a portion of the bus framework 140 extends along the axial direction, i.e., the portion of the bus framework 140 extends outwards to form the assembling portion 142, one assembling portion 142 is provided between two first welding hooks 1222, and the assembling portion 142 is configured to assemble the terminal assembly 220 of the electrical motor 200, and thus the reliable connection performance of the terminal assembly 220 is ensured.

In a specific embodiment, the bus assembly 100 comprises a plurality of bus bars 110, and the plurality of bus bars 110 are axially spaced along the electrical motor 200, each bus bar 110 comprises a plurality of bus segments 110*a*, and the plurality of bus segments 110*a* are arranged circumferentially along the electrical motor 200; one bus bar 110 is formed by the plurality of bus segments 110*a*, the length of one bus segment 110*a* in the circumferential direction is less than the entire length of one bus bar 110, then the processing difficulty of one bus segment 110*a* is significantly less than one complete bus bar 110, and furthermore, this is favorable for the molding of dies. The plurality of bus segments 110*a* of one bus bar 110 have the same structure, and thus, the plurality of bus segments 110*a* of one bus bar 110 can be prepared by one set of dies, and the number of bus bars 110 to be prepared is reduced, the processing difficulty of the bus bars 110 is lowered, the production efficiency is improved, the production costs of the bus bars are reduced and the product competitiveness is improved.

The plurality of bus bars 110 comprise at least three phase bus bars 120 and a neutral bus bar 130, and the at least three phase bus bars 120 have the same structure, and thus, the plurality of phase bus bars 120 can share one set of dies. The neutral bus bar 130 is provided at the side of the at least three phase bus bars 120 in the axial direction, and the structure of the neutral bus bar 130 is different from the structure of the phase bus bars 120. For the entirety of the bus assembly 100, only two sets of dies are needed, and this will greatly reduce the production costs of the bus assembly 100, and meanwhile, the preparing process of the bus segments 110*a* can further be simplified, and the working efficiency is improved.

The specific structure of each phase bus bar 120 is described; each of the phase bus bar 120 comprises a plurality of connecting portions 121, and the connecting portions 121 are used for assembling a terminal assembly 220 of the electrical motor 200. At least three phase bus bars 120 comprise a first bus bar 110, a second bus bar 110 and a third bus bar 110, which are axially arranged in sequence, and the second bus bar 110 and the third bus bar 110 rotate in the same direction around the central axis with respect to the first bus bar 110, and thus, the plurality of connecting portions 121 at different positions can be formed by the phase bus bars 120 of the same structure to be adaptive to the diversification of the interface of the electrical motor 200, and this can further improve the universality of the bus assembly 100, i.e., the bus assembly 100 can match multiple types of terminal assemblies 220.

In an embodiment, the three phase bus bars 120 comprise the first bus bar 110, the second bus bar 110 and the third bus bar 110, which are axially arranged in sequence, the second bus bar 110 and the third bus bar 110 rotate in the same direction around the central axis of the electrical motor 200 with respect to the first bus bar 110, in an embodiment, the second bus bar 110 and the third bus bar 110 rotate counterclockwise or clockwise. The position of the first bus bar 110 is fixed and does not change, the second bus bar 110 and the third bus bar 110 rotate in the same direction, and the connecting portions 121 on each of the phase bus bar 120 are arranged in a staggered way, that is, the connecting portions 121 on different phase bus bars 120 will not be shielded in the axial direction, and each connecting portion 121 can be exposed and has the possibility of assembling the terminal assembly 220.

Furthermore, the rotating angle of the second bus bar 110 with respect to the first bus bar 110 is the same as the rotating angle of the third bus bar 110 with respect to the second bus bar 110, and thus the structure arrangement is simplified. In an embodiment, one phase bus bar 120 comprises four first welding hooks 1222 arranged at even intervals, and two first welding hooks 1222 are provided on one phase bus segment 122, and the phase bus bars 120 integrally present a symmetrical structure, and this helps the staggered arrangement of the connecting portions 121 on the plurality of phase bus bars 120.

The first welding hooks 1222 extend away from the central axis, and the sub connecting portions 1223 extend away from the central axis. The plurality of bus segments 110*a* of each neutral bus bar 130 comprise two neutral bus segments 131, the two neutral bus segments 131 are arranged symmetrically at intervals along the circumferential direction, and the neutral bus segment 131 comprises a second welding hook 132 extending towards the central axis. Through disposing the first welding hooks 1222 and the second welding hooks 132 of different orientations, the plurality of welding hooks are prevented from concentrating on the same position, then the space is used reasonably, the distance between two adjacent welding hooks in the plurality of welding hooks is increased, the difficulty for winding wire, trimming wire and welding is lowered, and the assembly efficiency is improved.

Furthermore, the bus assembly 100 further comprises a bus framework 140, and the plurality of bus bars 110 are arranged at intervals on the bus framework 140. A positioning portion 141 is provided on the bus framework 140, the positioning portion 141 is configured to cooperate with a stator framework 210 of the electrical motor 200, the positioning portion 141 comprises a first positioning element 141*a* and a second positioning element 141*b*, the first positioning element 141*a* is provided on the wall surface of the bus framework 140 close to the central axis. The second positioning element 141*b* is provided on the wall surface of the bus framework 140 away from the central axis, to achieve internal and external two-stage positioning and installation, and thus all-around positioning connection is achieved between the bus framework 140 and the stator framework 210. The number of the first positioning element 141*a* is greater than the number of the second positioning element 141*b*, and thus the structure of the bus assembly 100 is arranged more reasonable within a limited space.

Figure 10:
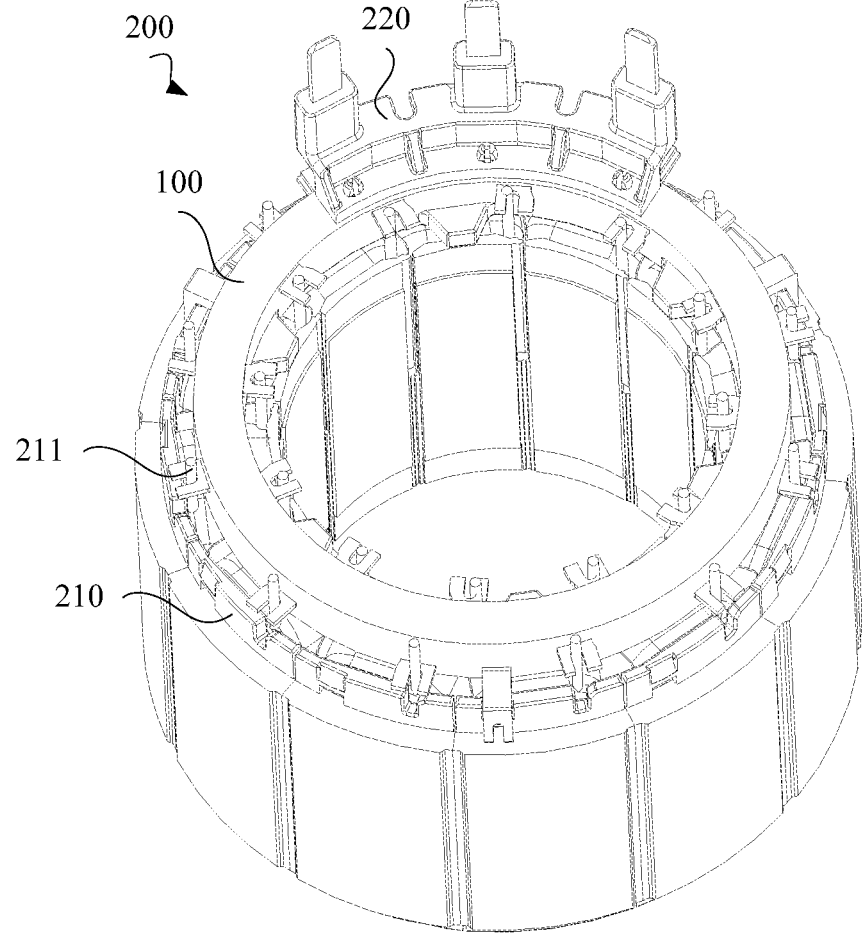
FIG. 10 shows the second schematic view of a portion of the structure of an electrical motor according to an embodiment of the present disclosure.
Figure 11:
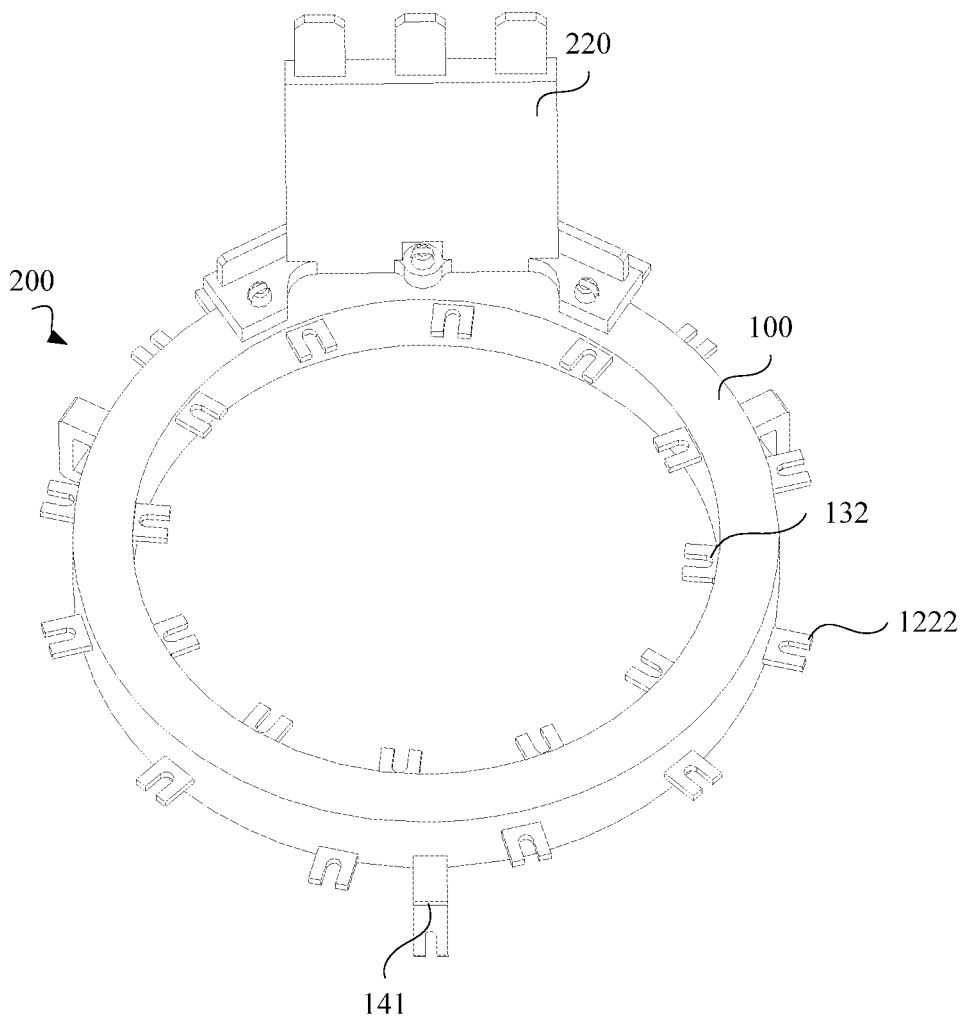
FIG. 11 shows the first schematic view of a portion of the structure of an electrical motor according to another embodiment of the present disclosure.
Figure 12:
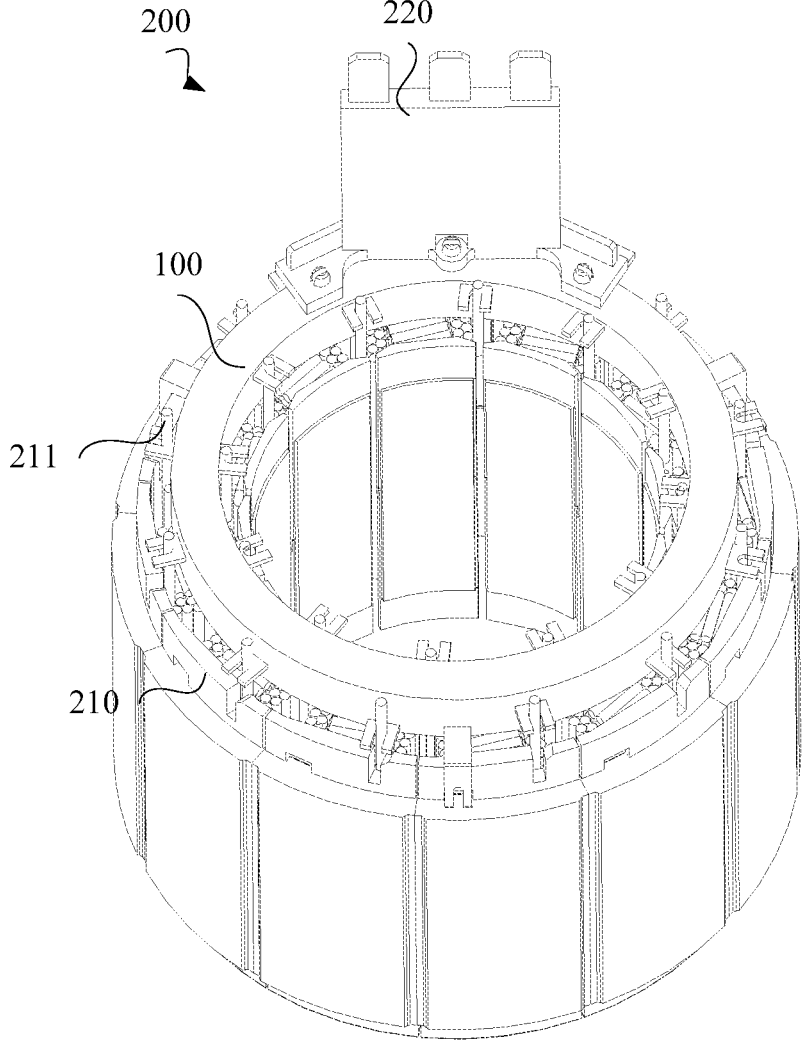
FIG. 12 shows the second schematic view of a portion of the structure of an electrical motor according to another embodiment of the present disclosure.
Figure 13:
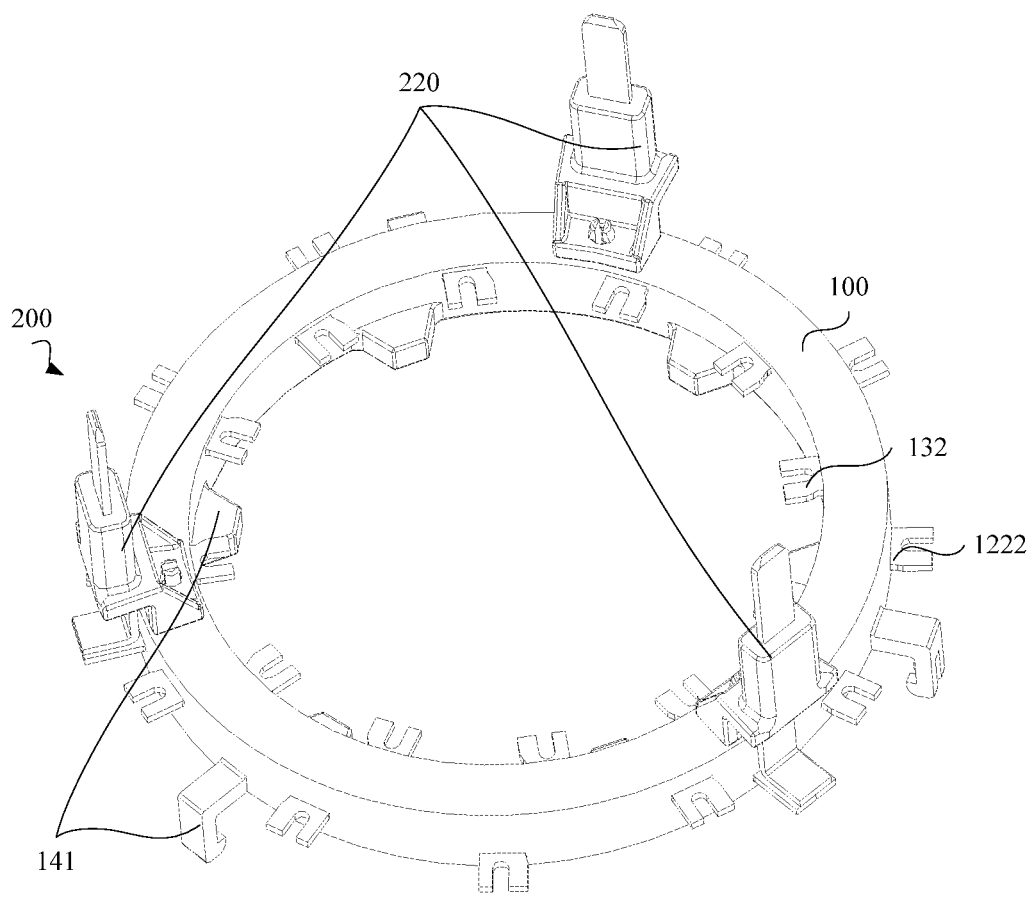
FIG. 13 shows the first schematic view of a portion of the structure of an electrical motor according to still another embodiment of the present disclosure.
Figure 14:
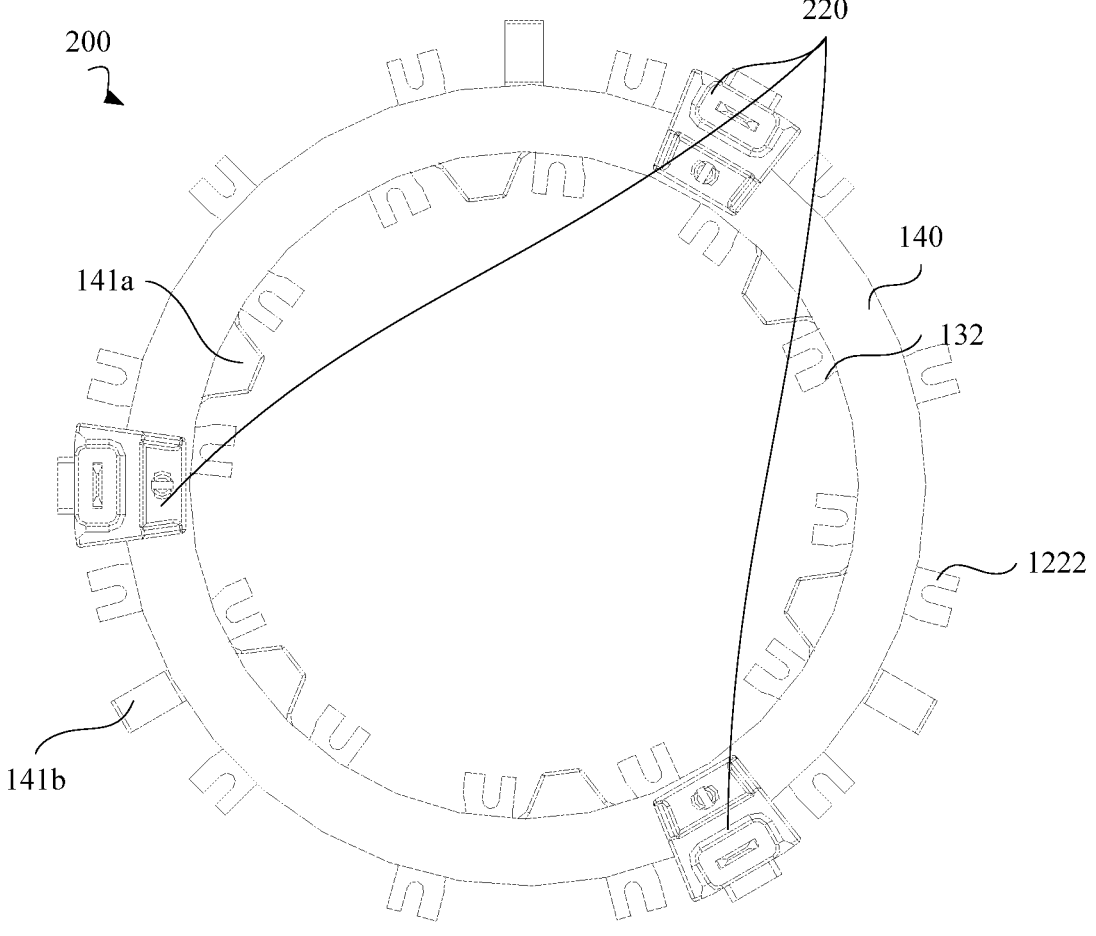
FIG. 14 shows the second schematic view of a portion of the structure of an electrical motor according to still another embodiment of the present disclosure.
Figure 16:
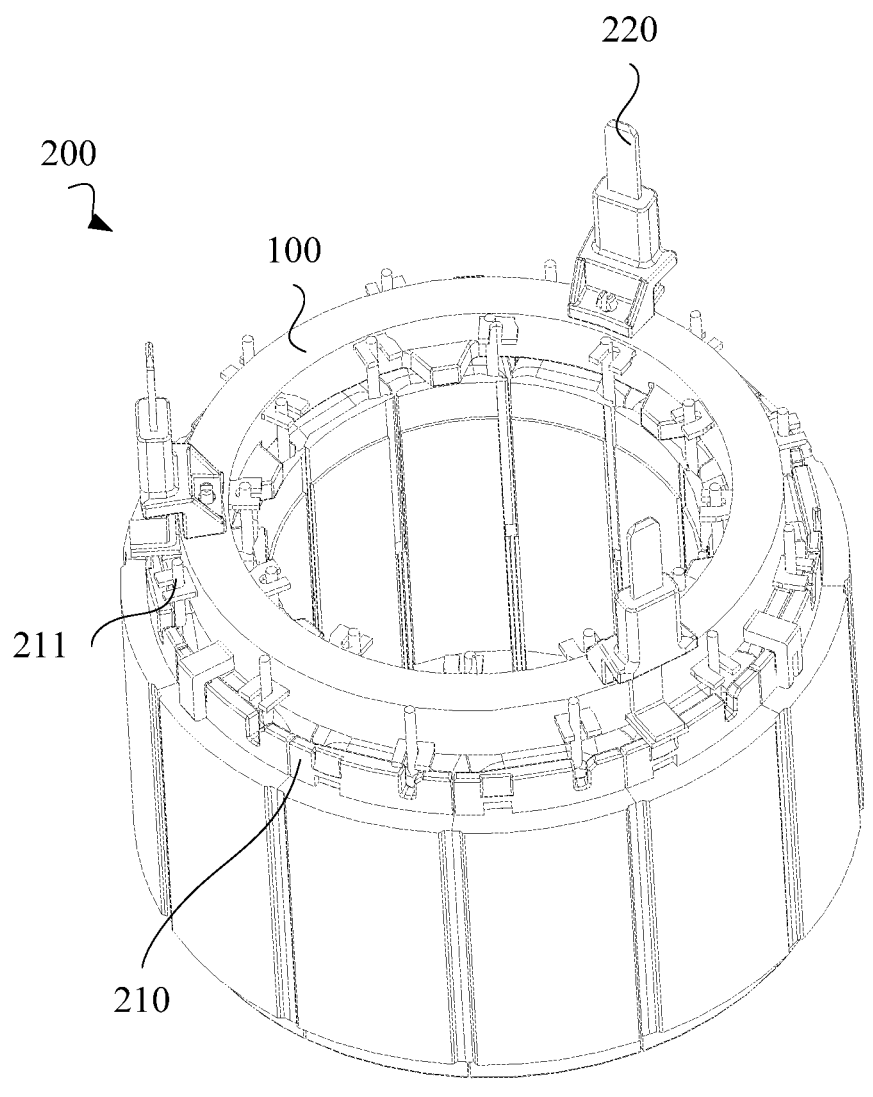
FIG. 16 shows the third schematic view of a portion of the structure of an electrical motor according to still another embodiment of the present disclosure.

The second aspect according to the present disclosure proposes an electrical motor 200, as shown in FIGS. 10, 12 and 16, the electric motor 200 comprises a housing, a stator framework 210 and the bus assembly 100 provided in any of the previous embodiments. The bus assembly 100 is provided in the housing, the stator framework 210 is provided at the side of the bus assembly 100 in the axial direction. A winding 211 is provided on the stator framework 210, and the winding 211 is connected to the first welding hook 1222 of the bus assembly 100.

The electrical motor 200 proposed by the present disclosure comprises the bus assembly 100 provided in any of the previous embodiments, and thus has all the beneficial effects of the bus assembly 100, which will not be repeated herein.

The bus assembly 100 comprises a plurality of bus bars 110, and the plurality of bus bars 110 are axially spaced along the electrical motor 200, to reduce the space requirement of the bus assembly 100 in the radial direction of the electrical motor 200. Each bus bar 110 is a conductor, and the bus bars 110 are configured to connect the winding 211 ends which need to be connected together in a plurality of windings 211 in the stator of the electrical motor 200, to achieve the electrical connection of the plurality of ends of the windings 211 and a bus function. Each bus bar 110 in the plurality of bus bars 110 comprises a plurality of bus segments 110a, one bus bar 110 is formed by the plurality of bus segments 110a, the length of one bus segment 110a in the circumferential direction is less than the entire length of one bus bar 110, then the processing difficulty of one bus segment 110a is significantly less than one complete bus bar 110, and furthermore, this is favorable for the molding of dies. Furthermore, the plurality of bus segments 110a of one bus bar 110 have the same structure, that is, the plurality of bus segments 110a of one bus bar 110 can be prepared by one set of dies, and the number of bus bars 110 to be prepared is reduced, the processing difficulty of the bus bars 110 is lowered, the production efficiency is improved, the production costs of the bus bars are reduced and the product competitiveness is improved.

In an embodiment, as shown in FIG. 2, the structures of the plurality of the bus bars 110 can be partially the same, then the bus bars 110 with the same structure can share one set of dies, and this can further reduce the costs of the dies. That is, the plurality of bus segments 110a of one bus bar 110 have the same structure. The structures of the plurality of the bus bars 110 can be partially equal, and can further be unequal. For one bus bar 110, the difficulty for molding can be lowered by the plurality of bus segments 110a, and only one set of dies is needed.

The material of the bus bars 110 is copper, copper has relatively good conductivity, and its price is relatively low; in addition, copper has advantages that it can be easily stamped and molded and has sufficient hardness.

For the plurality of bus segments 110a of one bus bar 110, the plurality of bus segments 110a are arranged along the circumferential direction, and the outer contour of the bus assembly 100 is in a ring shape, and it can be similar with the stator core of the electrical motor 200 in structure, and this helps the reasonable arrangement of the internal space of the electrical motor 200. In an embodiment, the plurality of bus segments 110a of one bus bar 110 can be connected by welding, and thus one bus bar 110 is formed. This improves the structural integrity of the bus bars 110 and facilitates the assembly of the bus bars 110. The plurality of bus segments 110a of one bus bar 110 can be arranged at intervals, and thus can be better adapted to the wiring requirements of the stator winding 211. In an embodiment, the plurality of bus bars 110 comprise two types. One type is a plurality of phase bus bars 120, and the other type is the neutral bus bar 130. The plurality of phase bus bars 120 have the same structure, and then can share one set of dies. In an embodiment, the number of the phase bus bars 120 is three, one phase bus bar 120 comprises two phase bus segments 122, and then, for the bus assembly 100, six phase bus segments 122 with the same structure can form three phase bus bars 120, and the six phase bus segments 122 share one set of dies. The neutral bus bar 130 comprises a plurality of neutral bus segments 131 with the same structure, when the structure of the neutral bus segments 131 is different from the structure of the phase bus segments 122, an additional set of dies is required for preparing the neutral bus segments 131. That is, for the entirety of the bus assembly 100, only two sets of dies are needed, and this will greatly reduce the production costs of the bus assembly 100, and meanwhile, the preparing process of the bus segments 110a can further be simplified, and the working efficiency is improved.

Furthermore, the stator framework 210 comprises a framework body and a cooperating portion. The cooperating portion is provided at the side of the framework body close to the bus assembly 100, and the cooperating portion is connected to the positioning portion 141 of the bus assembly 100.

In the embodiment, the stator framework 210 comprises the framework body and the cooperating portion, the cooperating portion is provided at the side of the framework body close to the bus assembly 100, and the cooperating portion is connected to the positioning portion 141 of the bus assembly 100, to achieve the accurate connection between the framework body and the bus assembly 100.

The positioning portion 141 and the cooperating portion can be in snap connection, or rivet connection, screw joint connection, etc.

Furthermore, the electrical motor 200 further comprises a control assembly and a terminal assembly 220, the control assembly is provided at the other side of the bus assembly 100 along the axial direction, and the control assembly comprises a controller. The terminal assembly 220 comprises a terminal framework 221 and a wiring terminal 222 provided on the terminal framework 221, the wiring terminal 222 is connected between the connecting portion 121 of the bus assembly 100 and the controller, and the terminal framework 221 is installed at an assembling portion 142 of the bus assembly 100.

In the embodiment, a portion of the terminal framework 221 extends into the assembling portion 142 of the bus assembly 100, and thus the connection of an insulation portion is achieved; one end of the wiring terminal 222 is connected to the controller, the other end of the wiring terminal 222 is connected to the connecting portion 121, and the winding 211 is connected to the controller through the bus assembly 100 and the wiring terminal 222.

The wiring terminal 222 and the connecting portion 121 are connected by a resistance welding manner, and apparently, they can further be connected by other welding methods such as ultrasonic welding or other fixed connection methods. In an embodiment, the number of the wiring terminal 222 is three.

Furthermore, as shown in FIGS. 13-16, a plurality of wiring terminals 222 are arranged at even intervals on the bus assembly 100, and then, one wiring terminal 222 is arranged corresponding to one terminal framework 221, the plurality of wiring assemblies are arranged at intervals on the bus assembly 100, and at the moment, two adjacent wiring assemblies are arranged at an interval of 120°.

Furthermore, as shown in FIGS. 7-12, a plurality of wiring terminals 222 are arranged at intervals on one terminal framework 221. A plurality of first welding hooks 1222 of the bus assembly 100 comprise third welding hooks located between adjacent wiring terminals 222. The terminal assembly 220 further comprises an avoid opening 223, and the avoid opening 223 is provided in the terminal framework 221 corresponding to the third welding hooks.

In the embodiment, a plurality of wiring terminals 222 are arranged at intervals on one terminal framework 221, in an embodiment, two adjacent wiring terminals 222 are arranged at an interval of 30°, the wiring terminals 222 have the same structure and can share one set of dies. Since the first welding hook 1222 extends outwards, when the terminal assembly 220 is mounted on the bus assembly 100, a portion of the terminal framework 221 will be located at the side of a portion of the first welding hook 1222 (the third welding hook) in the axial direction; considering the weldability of the third welding hook with the winding 211, the avoid opening 223 is provided in the terminal framework 221 corresponding to the third welding hook, and thus, the problem of interference possibly caused by the terminal framework 221 during the processes of winding wire and trimming wire can be prevented.

In an embodiment, the plurality of wiring terminals 222 can be arranged at intervals along the circumferential direction, or arranged in a straight shape, and the arrangement can be conducted according to wiring needs.

Furthermore, the number of the terminal framework 221 is one, the number of the wiring terminals 222 is multiple, and the plurality of wiring terminals 222 are provided on one terminal framework 221.

In the embodiment, the number of the terminal framework 221 is one, the plurality of wiring terminals 222 are concentratedly provided on one terminal framework 221, and the terminal assembly 220 as a whole helps the processing and molding of the terminal assembly 220. The plurality of wiring terminals 222 are arranged at intervals on the terminal framework 221, and one wiring terminal 222 is welded to one connecting portion 121 on the bus bar.

Furthermore, the plurality of wiring terminals 222 are arranged at intervals on one terminal framework 221 along the circumferential direction, and the plurality of wiring terminals 222 have the same structure.

In the embodiment, the plurality of wiring terminals 222 are arranged at intervals on one terminal framework 221 along the circumferential direction, and the plurality of wiring terminals 222 have the same structure, then the plurality of wiring terminals 222 can be prepared by sharing one set of dies, and thus the production costs are reduced.

Furthermore, the plurality of wiring terminals 222 are arranged in a straight shape on one terminal framework 221, and the structures of the plurality of wiring terminals 222 are different from one another.

In the embodiment, the plurality of wiring terminals 222 are arranged in a straight shape on one terminal framework 221, i.e., the plurality of wiring terminals 222 are concentratedly arranged on one terminal framework 221, and thus this improves the integrated level of the terminal assembly 220, helps install the plurality of wiring terminals 222 one time, and improves the assembling efficiency. Furthermore, the structures of the plurality of wiring terminals 222 are different from one another, one wiring terminal 222 is welded to one connecting portion 121, the plurality of wiring terminals 222 require an arrangement manner which is adaptive to the connecting portion 121, and therefore, the structures of the plurality of wiring terminals 222 are different from one another, and thus the plurality of wiring terminals 222 can be better welded to the connecting portion 121 at different positions.

Furthermore, the number of the terminal frameworks 221 is multiple, the number of the wiring terminals 222 is multiple, and the plurality of wiring terminals 222 are provided on the plurality of terminal frameworks 221 in a way of one-to-one correspondence.

In the embodiment, the number of the terminal frameworks 221 is multiple, the number of the wiring terminals 222 is further multiple, one wiring terminal 222 is matched with and provided on one terminal framework 221, the plurality of terminal frameworks 221 have the same structure, and the plurality of wiring terminals 222 have the same structure. One wiring terminal 222 and one terminal framework 221 constitute one wiring assembly, when the distances among different interfaces of the electrical motor are relatively large, a plurality of independent wiring assemblies can be adopted, and the cost is low and the assembling is convenient and rapid.

Furthermore, the plurality of wiring terminals 222 are provided at even intervals on the terminal frameworks 221 or the bus assembly.

In the embodiment, the plurality of wiring terminals 222 are provided at even intervals on one terminal framework 221, in an embodiment, two adjacent wiring terminals 222 are arranged at an interval of 30°, the wiring terminals 222 have the same structure and can share one set of dies, or the plurality of wiring terminals 222 are provided at even intervals on the bus assembly, at the moment, one wiring terminal 222 is arranged corresponding to one terminal framework 221, the plurality of wiring assemblies are arranged at intervals on the bus assembly, at the moment, two adjacent wiring assemblies are arranged at an interval of 120°.

Furthermore, the wiring terminal 222 comprises a connecting portion and a first welding portion, and the connecting portion is connected to the terminal framework 221. The first welding portion is connected to one end of the connecting portion close to the bus assembly and protrudes out of the terminal framework 221, and the first welding portion can be welded with the bus bar. The terminal assembly 220 further comprises an avoid opening, and the avoid opening is provided in the terminal framework 221 corresponding to the first welding portion.

In the embodiment, the wiring terminal 222 comprises the connecting portion and the first welding portion, and the connecting portion is provided on the terminal framework 221, the first welding portion is exposed on the terminal framework 221, i.e., the first welding portion is arranged protruding with respect to the terminal framework 221, and thus this helps weld the first welding portion with the connecting portion 121 on the bus bar. The terminal assembly 220 is further provided with the avoid opening, and the avoid opening is provided corresponding to the first welding portion. When the first welding portion is welded to the connecting portion 121, the terminal framework 221 can be prevented from interfering the welding effectively through the arrangement of the avoid opening, and the welding efficiency and the welding qualification rate are improved.

Furthermore, the wiring terminal 222 further comprises a second welding portion, the second welding portion is connected to one end of the connecting portion away from the bus assembly, and the second welding portion protrudes out of the terminal framework 221, and extends along the axial direction to be connected to the controller of the electrical motor.

In the embodiment, the wiring terminal 222 further comprises the second welding portion, the second welding portion and the first welding portion are disposed opposite to each other at the two opposite ends of the connecting portion, and the second welding portion is configured to be connected to the controller of the electrical motor. That is, the wiring terminal 222 has a function of electrically connecting the bus bars with the controller. Furthermore, the second welding portion is arranged protruding out of the terminal framework 221 to be conveniently connected to the controller. Furthermore, the second welding portion extends along the axial direction, to be conveniently connected to the contacts on the controller.

The third aspect according to the present disclosure proposes an electric power steering system, including the electrical motor 200 provided in any of the previous embodiments.

The electric power steering system proposed by the present disclosure comprises the electrical motor 200 provided by any of the previous embodiments, and thus has all the beneficial effects of the electrical motor 200, which will not be repeated herein.

The fourth aspect according to the present disclosure proposes a vehicle, including the electric power steering system provided in any of the previous embodiments.

The vehicle proposed by the present disclosure comprises the electric power steering system provided in any of the previous embodiments, and thus has all the beneficial effects of the electric power steering system, which will not be repeated herein.

The vehicle can be a traditional fuel vehicle, and can further be a new energy vehicle. The new energy vehicle comprises a pure electric vehicle, an extended-range electric vehicle, a hybrid electric vehicle, a fuel cell electric vehicle, a hydrogen engine car, etc.

In the present disclosure, the term of "multiple" indicates two or more, unless otherwise explicitly specified or defined. The terms of "assembling", "connected to", "connected to", "fixing" and the like should be understood in a broad sense, for example, the term "connected to" may be a fixed connection, and may further be a removable connection, or an integral connection; and the term of "connected to" may be a direct connection and may further be an indirect connection through an intermediate medium. A person of ordinary skills in the art could understand the specific meanings of the terms in the present disclosure according to specific situations.

In the description of the present specification, the descriptions of the terms "one embodiment", "some embodiments" and "specific embodiments" and the like mean that the specific features, structures, materials or characteristics described in combination with the embodiment(s) or example(s) are included in at least one embodiment or example of the present disclosure. In the specification, the schematic representation of the above terms does not necessarily refer to the same embodiment or example. Moreover, the particular features, structures, materials or characteristics described may be combined in a suitable manner in any one or more of the embodiments or examples.

The descriptions above are only some embodiments of the present disclosure, and are not configured to limit the present disclosure. For a person skilled in the art, the present disclosure may have various changes and variations. Any modifications, equivalent substitutions, improvements and etc. made within the spirit and principle of the present disclosure shall all be included in the protection scope of the present disclosure.

What is claimed is:

1. A bus assembly for an electrical motor, comprising:
a plurality of bus bars comprising at least three phase bus bars and a neutral bus bar, wherein the plurality of bus bars are axially spaced along the electrical motor and each bus bar of the plurality of bus bars comprising a plurality of bus segments arranged circumferentially along the electrical motor, wherein:

the at least three phase bus bars are identical, being formed from the same dies and each phase bus segment of the plurality of bus segments comprises:
a main body segment;
a first welding hook, provided on the main body segment; and
a sub connecting portion, provided at one end of the main body segment; and
the neutral bus bar is provided at a side of the at least three phase bus bars in the axial direction, and a structure of the neutral bus bar is different from a structure of the phase bus bars.

2. The bus assembly according to claim 1, wherein:
each of the three phase bus bars comprises a plurality of connecting portions, and the connecting portions are used for assembling a terminal assembly of the electrical motor; and
the at least three phase bus bars comprise a first bus bar, a second bus bar and a third bus bar, which are axially arranged in sequence, wherein, the second bus bar and the third bus bar rotate in the same direction around a central axis with respect to the first bus bar.

3. The bus assembly according to claim 2, wherein:
the rotating angle of the second bus bar with respect to the first bus bar is the same as the rotating angle of the third bus bar with respect to the second bus bar.

4. The bus assembly according to claim 2, wherein:
the plurality of bus segments of each phase bus bar comprise two phase bus segments, and the two phase bus segments are symmetrically arranged; and the sub connecting portion of one phase bus segment is welded to the sub connecting portion of another phase bus segment to form a connecting portion.

5. The bus assembly according to claim 4, wherein the first welding hook comprises:
a plurality of welding arms, connected at intervals to the main body segment, wherein the plurality of welding arms and the main body segment form a wire accommodating area, the wire accommodating area is configured to accommodate a winding of the electrical motor; and
wherein volumes of at least two welding arms in the plurality of welding arms are different.

6. The bus assembly according to claim 4, wherein:
one phase bus bar comprises four first welding hooks arranged at even intervals, and
two first welding hooks are provided on one phase bus segment.

7. The bus assembly according to claim 4, wherein:
the first welding hooks extend away from the central axis, and
the sub connecting portions extend away from the central axis.

8. The bus assembly according to claim 2, wherein:
the plurality of bus segments of each neutral bus bar comprise two neutral bus segments,
the two neutral bus segments are arranged symmetrically at intervals along the circumferential direction, and
each neutral bus segment of the two neutral bus segments comprises a second welding hook extending towards the central axis.

9. The bus assembly according to claim 1, wherein the bus assembly further comprises:
a bus framework, wherein the plurality of bus bars are arranged at intervals on the bus framework; and
a positioning portion, provided on the bus framework, wherein the positioning portion is configured to cooperate with a stator framework of the electrical motor, and the positioning portion comprises:

a first positioning element, provided on a wall surface of the bus framework close to a central axis of the electrical motor, and a second positioning element, provided on the wall surface of the bus framework away from the central axis of the electrical motor.

10. The bus assembly according to claim 9, wherein a number of the first positioning element is greater than the number of the second positioning element.

11. The bus assembly according to claim 9, further comprising:

an assembling portion provided on the bus framework, wherein the assembling portion is configured to assemble a terminal assembly of the electrical motor.

12. The electrical motor comprising the bus assembly according to claim 1, further comprising:

a housing, wherein the bus assembly is provided in the housing; and a stator framework provided at the side of the bus assembly in the axial direction, wherein a winding is provided on the stator framework and the winding is connected to the first welding hook of the bus assembly.

13. The electrical motor according to claim 12, wherein the stator framework comprises:

a framework body; and a cooperating portion provided at the side of the framework body close to the bus assembly, wherein the cooperating portion is connected to a positioning portion of the bus assembly.

14. The electrical motor according to claim 12, wherein the electrical motor further comprises:

a control assembly, provided at the other side of the bus assembly along the axial direction, wherein the control assembly comprises a controller; and a terminal assembly, wherein the terminal assembly comprises a terminal framework and a wiring terminal provided on the terminal framework, the wiring terminal is connected between a connecting portion of the bus assembly and the controller, and the terminal framework is installed at an assembling portion of the bus assembly.

15. The electrical motor according to claim 14, wherein:

a plurality of wiring terminals are arranged at intervals on one terminal framework;

a plurality of first welding hooks of the bus assembly comprise third welding hooks located between adjacent wiring terminals; and the terminal assembly further comprises an avoid opening, the avoid opening being provided in the terminal framework corresponding to the third welding hooks.

16. An electric power steering system comprising the electrical motor according to claim 13.

17. A vehicle comprising the electric power steering system according to claim 16.

* * * * *